United States Patent [19]

Gilhousen et al.

[11] Patent Number: 4,901,307

[45] Date of Patent: Feb. 13, 1990

[54] SPREAD SPECTRUM MULTIPLE ACCESS COMMUNICATION SYSTEM USING SATELLITE OR TERRESTRIAL REPEATERS

[75] Inventors: Klein S. Gilhousen, San Diego; Irwin M. Jacobs, La Jolla; Lindsay A. Weaver, Jr., San Diego, all of Calif.

[73] Assignee: Qualcomm, Inc., San Diego, Calif.

[21] Appl. No.: 921,261

[22] Filed: Oct. 17, 1986

[51] Int. Cl.[4] .............................................. H04J 13/00
[52] U.S. Cl. ........................................ 370/18; 375/1
[58] Field of Search .................. 370/18, 19, 95; 375/1

[56] References Cited

U.S. PATENT DOCUMENTS

| | | | |
|---|---|---|---|
| 3,596,002 | 7/1971 | Ohnsorge et al. | 179/15 |
| 3,761,813 | 9/1973 | Perrin | 325/4 |
| 4,030,033 | 6/1977 | Bibl et al. | 325/30 |
| 4,114,155 | 9/1978 | Raab | 343/105 |
| 4,164,628 | 8/1979 | Ward et al. | 179/15 |
| 4,172,257 | 10/1979 | Mahner | 343/854 |
| 4,189,677 | 2/1980 | Cooper et al. | 325/321 |
| 4,191,410 | 9/1981 | Caples et al. | 375/1 |
| 4,222,115 | 9/1980 | Cooper et al. | 375/1 |
| 4,291,409 | 9/1981 | Weinberg et al. | 375/1 |
| 4,359,733 | 11/1982 | O'Neill | 343/6.5 |
| 4,426,712 | 1/1984 | Gorski-Popiel | 375/96 |
| 4,455,651 | 6/1984 | Baran | 370/104 |
| 4,470,138 | 9/1984 | Gutleber | 370/18 |
| 4,494,228 | 1/1985 | Gutleber | 370/21 |
| 4,512,024 | 4/1985 | Gutleber | 370/18 |
| 4,703,474 | 10/1987 | Foschini et al. | 370/18 |

FOREIGN PATENT DOCUMENTS 2125654  3/1984  United Kingdom .................. 370/18

OTHER PUBLICATIONS

IEEE Communications, vol. 24, No. 2, Feb. 1986, pp. 8-15, Cellular System Design: An Emerging Engineering Discipline, James F. Whitehead.
IEEE Transactions on Aerospace and Electronic Systems, vol. AES-4, No. 5, Sep. 1968, Air-Ground, Ground-Air Communications Using Pseudo-Noise Through a Satellite, Blasbalg, Najjar, D'Antonio, Haddad, IBM Center for Exploratory Studies, IBM Space Systems Center.
IEEE Transactions on Vehicular Technology, vol. VT-27, No. 4, Nov. 1978, A Spread-Spectrum Technique for High-Capacity Mobile Communications, George R. Cooper, Raymond W. Nettleton.
Article from Telecommunication Journal, vol. 45, Jan. 1978 titled Spread-Spectrum Principles and Possible Application To Spectrum Utilization and Allocation by W. F. Utlaut.
Article from IEEE Communications Magazine, Mar. 1978 titled Cellular Land-Mobile Radio: Why Spread (List continued on next page.)

Primary Examiner—Douglas W. Olms
Attorney, Agent, or Firm—Brown, Martin, Haller & McClain

[57] ABSTRACT

A multiple access, spread spectrum communication system and method for providing high capacity communications to, from, or between a plurality of system users, using code-division-spread-spectrum communication signals. The communication system uses means for providing marginal isolation between user communication signals. The marginal isolation is provided by generating simultaneous multiple steerable beams; using an omni-directional antenna with polarization enhancement; using power control devices to adjust the output power for user generated communication signals either in response to their input activity level, or in accordance with a minimum allowable power for maintaining a communication link. The communication system can also employ a means for transmitting a predetermined pilot chip sequence contiguous with the code-division-spread-spectrum communication signals.

In further embodiments the communication system employs a plurality of user terminals linked to each other or to other services through one or more terrestrial or satellite repeaters. Multiple satellite repeaters are operable in a new communication mode to obtain further gains in signal isolation.

46 Claims, 11 Drawing Sheets

OTHER PUBLICATIONS

Spectrum? by G. Cooper, R. Nettleton and D. Grybos.
Paper from I.E.E. International Conference on Land Mobile Radio, Spread Spectrum Communication Systems for the Land Mobile Service by R. Ormondroyd, B. Eng and M. Shipton, Sep. 1979.

Article from AIAA 7th Communications Satellite Systems Conference titled Communications Satellite System Concept Based on the AMPA Experiment by S. Durrani and F. Keblawi, Apr., 1978.

Article from Electronics & Power titled The Spread Spectrum Controversy, Mar. 1980, pp. 222 and 224.

Excerpts from the book Communications Satellite Systems, 1978 by Martin, pp. 142-147, 189, 358-359, 365-367 by Prentice Hall, Inc.

Paper titled Low Cost Satellite Data Transmission Networks Using Demand Assigned TDMA by J. Husted and S. Dinwiddy.

Paper titled DYNAC: A Low Cost Data/Voice Communications Network by S. Salamoff, D. Ross and J. Steinhorn.

Excerpt from book titled Digital Communications by Satellite, 1977, Delay-Lock Tracking of Pseudonoise Signals, chapter 18, p. 578.

Ad by Equatorial Communications Co. entitled Satellite Network For Point-To-Multipoint Data Distribution.

Excerpt from book entitled Spread Spectrum Systems, 1976, Applications of Spread Spectrum Methods, Chapter 9.

Paper titled Subjective Evaluation of Dedicated Multiple-Hop Satellite Communications for Government and Military Users by S. Campanella, H. Suyderhoud and M. Onufry.

ANTENNA MARGINAL GAIN

| ATTN. RANGE (dB) | | CUM. ANGLE (°) | Δ ANGLE (°) | # USERS (USERS) | WTD # USERS (USERS) |
|---|---|---|---|---|---|
| 0 | 1 | 0.6 | 0.6 | 189 | 188.59 |
| 1 | 2 | 1.0 | 0.4 | 126 | 99.87 |
| 2 | 3 | 1.4 | 0.4 | 126 | 79.33 |
| 3 | 5 | 1.8 | 0.4 | 126 | 63.01 |
| 5 | 7 | 2.1 | 0.3 | 94 | 29.82 |
| 7 | 10 | 2.4 | 0.3 | 94 | 18.81 |
| 10 | 15 | 2.8 | 0.4 | 126 | 12.57 |
| 15 | 25 | 3.2 | 0.4 | 126 | 3.98 |
| 25 | ∞ | 7.4 | 4.2 | 1320 | 4.17 |
| TOTALS | | | 7.4 | 2326 | 500.17 |

FDMA REUSE FACTOR
2.64

CDMA REUSE FACTOR
4.65

FIG. 1b

RELATIVE CAPACITY INCREASE AND
POLARIZATION ISOLATION vs. ELLIPTICITY

| ELLIPTICITY (dB) | AXIAL RATIO | CAPACITY INCREASE | POLARIZATION ISOLATION (dB) |
|---|---|---|---|
| 0.00 | 1.00 | 100% | -∞ |
| 2.00 | 0.63 | 79% | -18.81 |
| 4.00 | 0.40 | 63% | -12.91 |
| 6.00 | 0.25 | 50% | -9.57 |
| 8.00 | 0.16 | 40% | -7.32 |
| 10.00 | 0.10 | 32% | -5.69 |
| 12.00 | 0.06 | 25% | -4.46 |
| 14.00 | 0.04 | 20% | -3.51 |
| 16.00 | 0.03 | 16% | -2.78 |
| 18.00 | 0.02 | 13% | -2.20 |
| 20.00 | 0.01 | 10% | -1.74 |

FIG. 14

SPREAD SPECTRUM MULTIPLE ACCESS COMMUNICATION SYSTEM USING SATELLITE OR TERRESTRIAL REPEATERS

BACKGROUND OF THE INVENTION

Technical Field

The present invention relates to multiple access communication systems and more particularly to a method and apparatus for employing Code Division Multiple Access (CDMA) spread spectrum signals to provide communication services for mobile or remote user terminals using satellite or terrestrially based repeater apparatus. The present invention further relates to utilizing CDMA spread spectrum signals with multiple beam phased array repeater antennas, polarization enhanced omni-directional mobile antennas, voice or data activity switching, adjustable user terminal power control, and L frequency band communication links.

Background

There has been a long-standing need to provide quality communication services to many groups of service users that are classified as remote or mobile or both. These users include rural telephone systems, police and other governmental agencies, commercial dispatching and paging systems, emergency services, and marine telephone. In the past these needs were partially satisfied by land mobile radio. However, these services have always been faced with more potential users than system capacity. The frequency or spectral bandwidth allocations do not provide enough capacity to simultaneously handle the total number of potential users.

Even so, private individuals, businesses, and new classes of users, such as aeronautical communications, are creating an ever increasing demand for services for both mobile and remote users. A large increase in the number of remotely accessible computers and data systems has also created a demand for remote and mobile digital data communications in addition to voice communications. In addition, new types of remote data collection or sensing, and alphanumeric keypad or keyboard entry systems are being proposed which can not be serviced by current communication systems. Therefore, new communication systems are being proposed and built to serve these demands for service.

In building or implementing any new communication system, the key issue for both the designer and the end user is the channel capacity of the system. In a commercial system, capacity translates directly into income or economic feasibility which is important to the system operator, since capacity determines the number of revenue generating users that can be accommodated. The number of allowable users is in turn important to the potential service users. The number of simultaneous users and, therefore, capacity supported by any communication system is determined by the amount of mutual interference between users.

Current mobile radio services operate as frequency division multiplexed (FDM) or frequency division multiple access (FDMA) systems which divide the available bandwidth into smaller bands or channels. To decrease mutual interference some of the bandwidth is also assigned to "guard bands" between channels to provide attenuation or isolation between users. Full duplex communication requires two channels. The total number of channels is generally divided in half, one half being for uplink and call control to a central base repeater and the other for downlink and control signals to users. In addition, some channels may be allocated for additional user protocol and call control. Therefore, the number of simultaneous users is much lower than the apparent number of channels.

System capacity can be increased by increasing the number of channels but this decreases channel bandwidth which limits voice quality and the use of high speed data transfers. Instead, the preferred technique for increasing system capacity is frequency reuse. Frequency reuse is the process of using the same frequency in two separate geographic regions for two distinct communication links as long as the two regions are attenuated or isolated from each other by a minimum value for signal rejection by the two user receivers.

Typical isolation or attenuation requirements for adequate rejection of unwanted signals are on the order of 15 dB (FM type) to 30 dB (AM) or more down from the desired signals. Therefore, a communication system can be subdivided into geographical regions and the same frequency can simultaneously be "reused" in neighboring regions which are isolated from each other by the appropriate attenuation. This technique is easily applied in land mobile radio systems since radio waves are inherently attenuated proportional to the square of the distance from the radiating source (in free space). Systems operating in large urban areas actually appear to experience $1/r^3$ to $1/r^5$ attenuation due to buildings and other absorbing structures.

Users geographically removed from each other by an appreciable distance naturally have their communication signals attenuated with respect to each other. Therefore, a communication system can be constructed using several interconnected base stations positioned so that signals from adjacent stations experience a 15 to 30 dB attenuation with respect to each other. To further increase capacity the geographical regions served by base transceivers are divided into successively smaller sizes which are separated by the appropriate attenuation or isolation, to allow for increased frequency reuse.

This is the basis for cellular telephone technology which is the current approach to accommodating large numbers of mobile users. Here, each cell comprises a geographical region serviced by a central base station which uses land based communication lines and switching systems to form an interlinked system with other base stations so that the only airborne transmissions are localized across the cell. To decrease mutual interference and increase system capacity, frequency use is controlled to assure a minimum amount of isolation between users by assigning channels so that at least one "guard" cell is positioned between two users using the same channel. Each cell is large enough so that signals crossing a cell are attenuated a substantial amount so that they are perceived as lower level noise in distant cells The cellular system employs a central controller that uses advanced processing technology to keep track of all the channel assignments within the system to maintain the required channel isolation. However, hand-off now becomes a problem. In hand-off, a mobile user crosses from one cell where the current frequency is allowed into a cell where it is not. This requires the system to change the frequencies used for the communication link. If a channel is unavailable in an adjacent cell, the call fails abruptly at cell borders.

A related problem of current channel assignment schemes is the inability to have instant access to the communication system at any time. Channel assignments increase the time the central controller requires to establish a communication link and may even prevent calls from being established.

Cellular systems also suffer from multipath problems, especially near cell borders, where users receive desired signals both from a central transmitter and sources such as reflections from buildings. If the signals add out of phase then they may cancel and become severely degraded. This problem is also encountered in radio telephone and other current mobile systems.

A similar problem occurs for mobile users moving away from central transmitters at speeds that give rise to Doppler effects and phase shifts. Here the standing wave pattern from the transmitter appears to fade every half wavelength creating continual reception problems. In addition, motion on the order of 70 mph can produce Doppler shifts on the order of +/−80 Hz at frequencies of 800 MHz which can increase inter-channel interference.

The FM type cellular and radio telephone system broadcasts are not efficient techniques for transferring digital data signals. Current user demands call for data transmission links that are high quality exhibiting very low bit error rates on the order of $10^{-6}$ or $10^{-8}$ at data transfer rates on the order of 2400 to 4800 baud with future data transfer rates extending up to 19,200 baud.

Increasing capacity by using smaller cells is useful in large, high user density, metropolitan or urban regions but not in low user density rural regions. Increased capacity is not likely to be achieved economically (cost of base station versus number of users served in region) in rural areas. Therefore, while cellular telephone meets some of the demands of large metropolitan areas it does not meet the demands of rural areas which comprise 25 percent of the population and 84 percent of the land mass for countries like the United States. In addition, larger rural cells can decrease the frequency reuse in adjacent urban areas. This occurs because a single large cell is adjacent to several small cells which cannot use the same frequency. This and other design considerations and problems for cellular systems are discussed in further detail in IEEE COMMUNICATIONS MAGAZINE, Vol. 24, No. 2, February, 1986, especially pages 8–15 which are incorporated herein by reference.

It has previously been assumed that satellite systems are required to economically provide service to low density, rural or remote areas. However, satellite systems generally utilize high volume communication links to transfer otherwise terrestrially based telephone communications over single large distances between terrestrial relay stations for further transfer This does not address the needs of mobile users or system users already without local telephone service.

Some satellite systems have been proposed to address single users through individual antennas instead of central relay stations, but the frequencies at which satellites operate and the methods of transmission have led to the use of rather large fixed antennas which are expensive and not amenable to use in mobile systems.

Proposed satellite services generally operate as FDMA systems employing UHF frequency repeaters and AM modulation schemes such as Amplitude Commanded Single Sideband (ACSSB). Frequency reuse can be used for satellite systems similar to cellular systems discussed above The continental U.S can be divided into geographical regions or cells by using a multiple beam antenna where a separate beam is used for each region. If the signals in each region or antenna pattern experience an attenuation on the order of say 10 db with respect to those in the nearest neighbor region and 20 dB with respect to the next adjacent regions and so forth, then a given frequency can be reused two regions away based on 20 dB sensitivity rejection. This roughly doubles the number of users allowed at any time within a transcontinental communication system. However, this does not match demand for services.

Antenna designs have been proposed which would scan the antenna patterns across the target geographic regions using advanced frequency scanning techniques. These antenna schemes take advantage of the fact that different frequencies can be reflected at different angles by a given antenna reflector as used on communication satellites. This means that as the frequencies transmitted by the antenna radiator system change, the virtual spot created on the earth by the antenna reflector will move. In this manner the same antenna structure is made to alter the beam location. However, such techniques use the antenna structure to direct different frequencies to different regions, thus failing to fully take advantage of frequency reuse by allocating only a portion of the total spectrum to each region.

Satellite systems do not use terrestrially based repeaters that communicate directly with users or a series of multiple satellites that communicate with the same user. Therefore, current systems do not provide universal service, that is, the ability for users to change position over a large geographical range and still be able to communicate without using alternate transmission equipment or new frequency bands. In multiple satellite systems frequency reuse would be limited by the isolation between geographic target regions. Satellite systems also experience multipath, blocking, and fading problems similar to mobile radio and telephone systems.

Alternate methods of decreasing user interference include time division multiple access (TDMA) or multiplexed (TDM) systems. Such systems use a central receiving station to multiplex or interleave separate user signals in time so that each signal only uses a portion of the total outgoing signal to the satellite. The time division approach divides the total spectrum up into predetermined temporal increments. All signals in the communication repeater system are allocated portions of this time controlled sequence. Therefore, no other user is using the link at the same exact time. The allocated portions are very small and the interleaving very large so that it appears simultaneous to all users. However, this time based synchronization of signals creates a natural limit to the number of users that can be coordinated "simultaneously" which is lower than desired. Also synchronizing a large number of simultaneous users greatly increases the complexity and cost of the system.

What is needed is a communication system that accommodates a larger number of users throughout a variety of user environments from high density urban to very low density rural. The communication system needs to exhibit increased capacity within standard spectral allocation bandwidths but with the same or better communication quality than presently available In addition, a need also exists for a communication system capable of handling high speed low bit error rate digital data transfers at low power densities.

SUMMARY

Therefore, with the above disadvantages present in the art in mind, it is an object of the present invention to provide a multiple access communication system having high simultaneous user capacity.

It is another object of the present invention to provide a communication system having automatic Doppler shift and fade control.

It is a purpose of the present invention to provide a communication system capable of expansion to meet future needs and interface with future alternative communication systems.

It is a further purpose of the present invention to provide an inexpensive communication system user terminal capable of meeting the needs of a variety of mobile or remote users.

It is yet another purpose of the present invention to provide for transmission and receipt of high speed digital data signals with very low bit error rates.

These and other objects, purposes, and advantages are provided in a multiple access, spread spectrum communication system, having means for communicating information signals to, from, or between a plurality of users, using code-division-spread-spectrum communication signals and isolation means for providing marginal isolation between said user communication signals. The isolation means can comprise a phased array antenna coupled to means for generating substantially simultaneous multiple steerable beams; an antenna structure configured to obtain either one or both of two circular polarization states; transceiver means for transmitting or receiving the same communication signals by two or more locations to create constructive interference maximized signal reception; first power control means for adjusting an output power duty cycle for said code-division-spread-spectrum communication signals in response to a predetermined activity level for said information signals; or second power control means for adjusting said output power level for said code-division-spread-spectrum communication signals in response to a minimum power level required to complete a communication link.

The preferred embodiment of the multiple access, spread spectrum communication system of the present invention further comprises means for transmitting a predetermined pilot chip sequence to users contiguous with said code-division-spread-spectrum communication signals.

In a preferred embodiment the means for communicating comprises chip generation means for generating a plurality of quasi-orthogonal spreading functions; code selection means for assigning one of the spreading functions to a user; and a plurality of mobile user terminals capable of transmitting or receiving code-division-spread-spectrum communication signals. Each of the user terminals uses a transmitter for generating a code-division-spread-spectrum communication signal according to an assigned spreading function in response to an input information signal; a receiver for detecting a code-division-spread-spectrum communication signal and generating an output information signal according to said assigned spreading function; and an omni-directional antenna. At least one repeater is used for receiving communication signals from the plurality of user terminals and for translating the code-division-spread-spectrum communication signals to a form suitable for transfer to an intended recipient.

In a further aspect of the invention the repeater preferably employs means for transmitting a predetermined pilot chip sequence to users contiguous with a communication link and the receivers include a pilot sequence tracking loop. An activity detector is included in the repeater for sensing signal activity levels in said information signals and decreasing repeater transmission power duty cycle in response to a decrease in sensed activity below a predetermined threshold level for a predetermined sampling time.

The user terminals can also comprise an activity detection means for sensing signal activity levels in the input information signals and decreasing user terminal transmission power duty cycle in response to a decrease in sensed activity below a predetermined threshold level.

The terminals can further comprise power control means for sensing a received power level present in received code-division-spread-spectrum communication signals and for adjusting the output level power applied to an antenna for transmitting code-division-spread-spectrum communication signals in response to the sensed power level.

The antenna of the preferred embodiment further comprises polarization control means for adjusting the antenna so as to select a predetermined polarization mode.

In further aspects of the invention the repeater means can comprise at least one terrestrially based repeater or at least one satellite based repeater or both. The communication system preferably employs at least two satellites and earth based repeaters. Generally the satellite repeaters are interconnected to other communication systems using a central control station known as a hub. Users can access either type of repeater based on their location and assigned communication links. In this manner universal service is obtained in a manner previously unavailable and terrestrial repeaters in high user density regions can offload local users to decrease the power drain on satellites or increase their capacity. The repeaters preferably use a phased array antenna structure to create simultaneous multiple steerable beams.

In still further aspects of the invention the communication system further comprises a demodulator, using a radio frequency mixer to correlate a local reference signal with input code-division-spread-spectrum communication signals. The resulting intermediate frequency spread spectrum signal is filtered to remove undesirable frequency components. A phase division means connected in series with the filter divides the spread spectrum signal into an analog in-phase signal and an analog quadrature signal which are then converted into digital in-phase and quadrature signals at a variable rate. Combiner means transfers the digital in-phase and quadrature signals onto a single data line in serial fashion for processing by other components within the demodulator.

A pilot chip reference means generates a local bit sequence corresponding to a predetermined pilot chip sequence transmitted contiguous with communication signals received by the demodulator. Carrier tracking means connected to the combiner and the pilot reference means compares the local pilot chip sequence to received signals in a timed relationship to determine the timing of the code-division-spread-spectrum communication signals with respect to the said local pilot chip sequence. A decision is then made to adjust the frequency of the local mixer frequency source. Chip synchronization means connected to the combiner and the pilot reference means compares the local pilot chip sequence to received signals in a plurality of timed relationships to determine the timing of code-divisionspread-spectrum communication signals with respect to the local pilot chip sequence. The comparison determines if the rate for the analog-to-digital conversion needs adjusting.

Unit chip means generates a bit sequence corresponding to an assigned spreading function which is used by despreading means connected to the combiner for generating despread-spectrum in-phase and quadrature information signals. These signals are then combined in an output means to form an output information signal.

The present invention provides a method of providing high capacity multiple access communications to a plurality of communication service users, by converting a plurality of narrow band analog input or digital data input signals into a plurality of wide band code-division-spread-spectrum communication signals, using an assigned spreading function and a predetermined carrier frequency; applying marginal isolation to the plurality of code-division-spread-spectrum communication signals; transmitting the code-division-spread spectrum communication signals to or from users; and converting a code-division-spread-spectrum communication signal received by a user to a narrow band analog or digital information signal.

The method of the present invention may also comprise the steps of transmitting a pilot chip sequence and transmitting and receiving signals through repeaters. The repeaters can include at least one terrestrial and/or at least one satellite based repeater.

BRIEF DESCRIPTION OF THE DRAWINGS

The novel features of the present invention may be better understood from the accompanying description when taken in conjunction with the accompanying drawings in which like characters refer to like parts and in which:

FIG. 1b is a table of actual and "weighted" users versus antenna gain and angular deviation for the antenna of FIG. 1a when used in the communication system of the present invention;

FIG. 14 is a tabular listing of capacity versus ellipticity and axial ratio;

DETAILED DESCRIPTION OF PREFERRED EMBODIMENTS

Figure 1A:
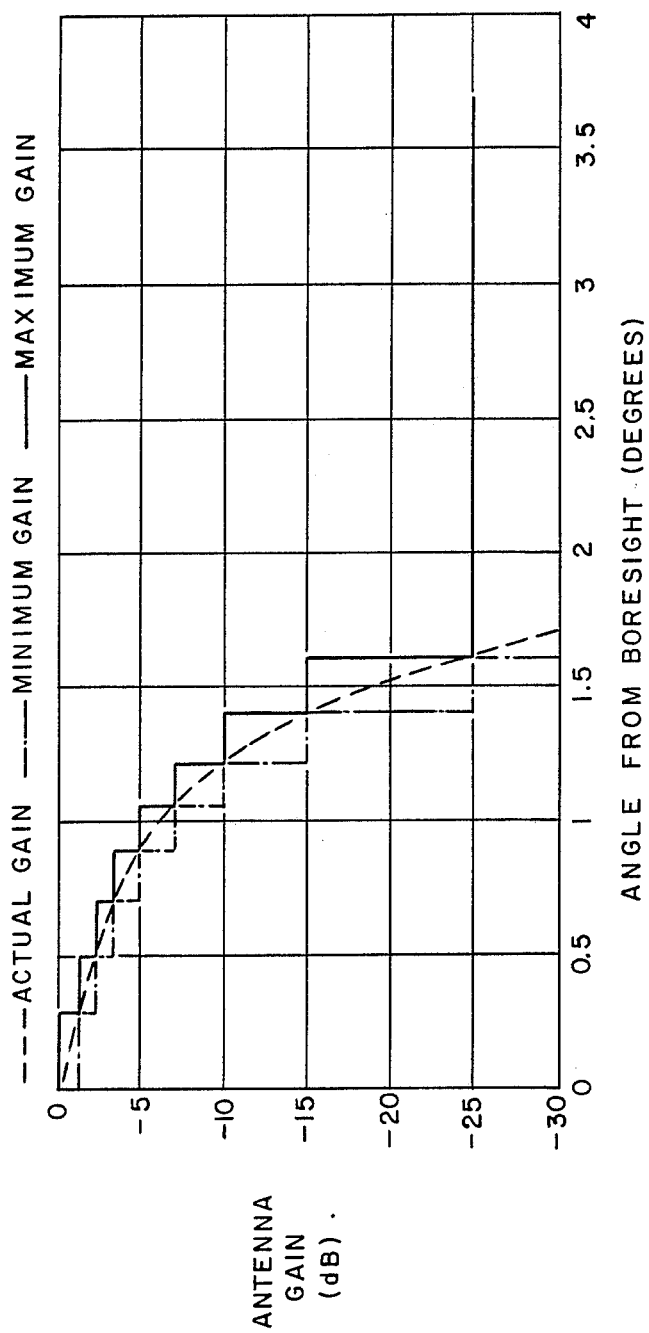
FIG. 1a is a plot of antenna gain versus angular deviation from boresight center for an exemplary antenna used in a satellite communication system.

The present invention comprises a new communication system employing one or more satellite or terrestrially based repeater stations to provide communication links among a large number of mobile or fixed, and local or remote users. To obtain a large number of users, the user terminals within the communication system employ new modulators and demodulators to transmit forward-error-correcting-coded communication signals using Code Division Multiple Access (CDMA) spread spectrum transmission signals. In addition, system capacity and communication is further enhanced by using means for providing marginal isolation between users comprising multiple beam phased array repeater antennas, polarization enhanced mobile antennas, means for generating interference patterns for reception and transmission of communication signals, voice or data activity switching, or adjustable user terminal power control. Additionally, independent pilot chip sequence signals are used to improve acquisition and tracking.

Traditionally, CDMA has been held to be inferior as a multiple access technique in comparison to FDMA and TDMA because it appeared to provide inferior spectral utilization. This was based on the argument that for TDMA or FDMA, the number of equal bandwidth channels that a given band can be divided into is approximately equal to the total bandwidth divided by the bandwidth per user channel. Whereas, CDMA provides fewer channels according to the following argument.

In a bandwidth limited environment where a number of equal users desire to share a common frequency band using CDMA, the number of such equal users is determined by the following formula:

$$I/S = W/R - E_b/N_o \tag{1}$$

where

I is the total interference power seen by each user's receiver and is equal to the total power of all the users, which is equal to the number of users times the power per user;

S is the power of one user's signal, thus I/S equals the effective number of users;

W is the bandwidth occupied by the spread spectrum signals;

R is the data rate of each user; and $E_b/N_o$ is the signal-to-noise ratio required for the modulation and coding system employed Since it can be seen that W/R is the TDMA and FDMA capacity, the CDMA capacity would seem to be always less by an amount equal to $E_b/N_o$, for practical systems, approximately 3–5 dB, depending on the particulars of the modulation and coding system employed.

The present invention greatly increases the capacity of CDMA systems by employing means for producing marginal isolation. The term, marginal isolation, will be defined herein. The key idea is that the spread spectrum receiver sees the weighted sum of all the users' incident power as interference to the one desired signal. If the system includes means to provide non-uniform weighting, then increases in capacity can be obtained from differences in weighting. Differences too small to be of use to FDMA or TDMA systems are quite valuable to a CDMA system.

In previously proposed CDMA satellite systems, a wide band transponder with earth coverage antenna has been employed. Such an antenna provides nearly the same gain to all users, no marginal isolation is realized and performance is, in fact, worse for CDMA than for TDMA or FDMA. The present invention, however, utilizes a multiple steerable beam antenna which provides the capability to realize marginal isolation. Such an antenna also increases the capacity of FDMA and TDMA systems, but provides far more capacity gain for CDMA. This is because FDMA and TDMA systems require at least 15 dB isolation of co-channel signals in order to provide acceptable performance, while the CDMA system obtains useful capacity increases from isolation as small as 1 dB.

Marginal isolation is defined as a system characteristic that provides unequal weighting of the incident received power of interfering user signals. Embodiments of the present invention utilize several mechanisms for providing marginal isolation, including multiple steerable beam antennas, antenna polarization, formation of interference beam patterns from multiple satellites, path loss differentials for interferors at different distances, and less than continuous transmit duty cycle. Additional methods of producing marginal isolation may be devised by those skilled in the art of communications system design.

An exemplary communication system 30 would use a spread spectrum bandwidth, W, of 8 MHz and an information signal bandwidth, R, of 5 kHz for a bandwidth ratio of 1600 and a processing gain of 32 dB. If we assume $E_b/N_o$ to be 5 dB, the number of users can be computed from equation 1. Under these conditions I/S is 27 dB. The total number of users (I+S) is, therefore, approximately 500. This means that the communication system supports 500 users under these conditions. But these are users all operating under the same conditions and with equal power and isolation within the system.

If instead the system users are isolated or contribute unequally to the interference in the system communication link, new users can be added. This can be illustrated using an antenna pattern that exhibits a relatively flat "response" or gain across the middle of a beam width and then falls off sharply on the edges. If we assume an equal distribution of users over an area larger than the central high gain portion of the antenna beamwidth, then each user is "weighted" by the relative gain effected for its signal because of a roll-off in gain. FIG. 1, shows the impact of this roll-off for a communication system.

FIG. 1a shows a plot of the actual, maximum, and minimum gains versus single-sided angle from boresight of a typical satellite antenna used for L-Band transmission from synchronous orbit. This antenna pattern represents an antenna optimized for an FDMA system, not a CDMA system. FIG. 1b shows the minimum and maximum gain data in a tabular form with gain regions and angles expressed as double-sided or total angle from the center of the boresight. If we use the maximum gain in each region and the gain factor for the entire region and assume that there is a uniform distribution of users across the typical 7.4° width of the United States, then FIG. 1b shows how a total population of 2326 users has the same effective interference as 500 users having the strength of the user of interest.

The "Δ Angle" column gives the angle size of each gain range. The "# of Users" column is calculated by multiplying the total number of users by the fraction of users at this gain. The following equation is used:

$$\# \text{ of Users} = \frac{\Delta \text{ Angle}}{\text{Total Angle of US}} \text{ Total Users} \quad (2)$$

The "Weighted # of Users" column is calculated by multiplying the "# of Users" column by the maximum gain of that range. This calcuates the equivalent number of users at 0 dB that would produce the same interference as the users in this region at this maximum gain. The following equation is used:

$$\text{Weighted \# of Users} = \frac{\# \text{ of Users}}{10 - (\text{MaxGain}/10)} \quad (3)$$

It is important to note how even attenuations of as small as 1 dB reduce the weighted total Lastly, the "Weighted # of Users" is totaled. The number of users in the U.S. was adjusted for purposes of illustration so that the "Weighted Total" was approximately 500 users as used above.

The "CDMA Reuse Factor" of 4.65 was calculated as the ratio of 2326:500. The "FDMA Reuse Factor" of 3.70 was calculated as 7.4°/(1.0° 2). 7.4° is the width of the U.S., 1.0° is the 2 dB beamwidth of the antenna, and one needs to use one half of the frequencies in one beam and then the other half in the next beam; so it takes two beamwidths before the frequencies. Using the antenna optimized for FDMA, CDMA shows a better reuse factor. If the same size antenna is optimized for CDMA—minimum noise beamwidth—then the CDMA reuse factor can be further increased to 6.67 giving a reuse gain of 6.67/3.70=1.80.

As can be seen, the total number of "effective" users is 500 while the system is actually supporting 2326 users if multiple beam positions are provided so that all users can be received near the center of a beam. Therefore, the system uses marginal isolation of a few dB, which is useless to other systems, to provide frequency reuse. This ability to increase the effective adjacent user attenuation allows the present communication system to provide greatly increased frequency reuse as compared to other communication systems.

Figure 2:
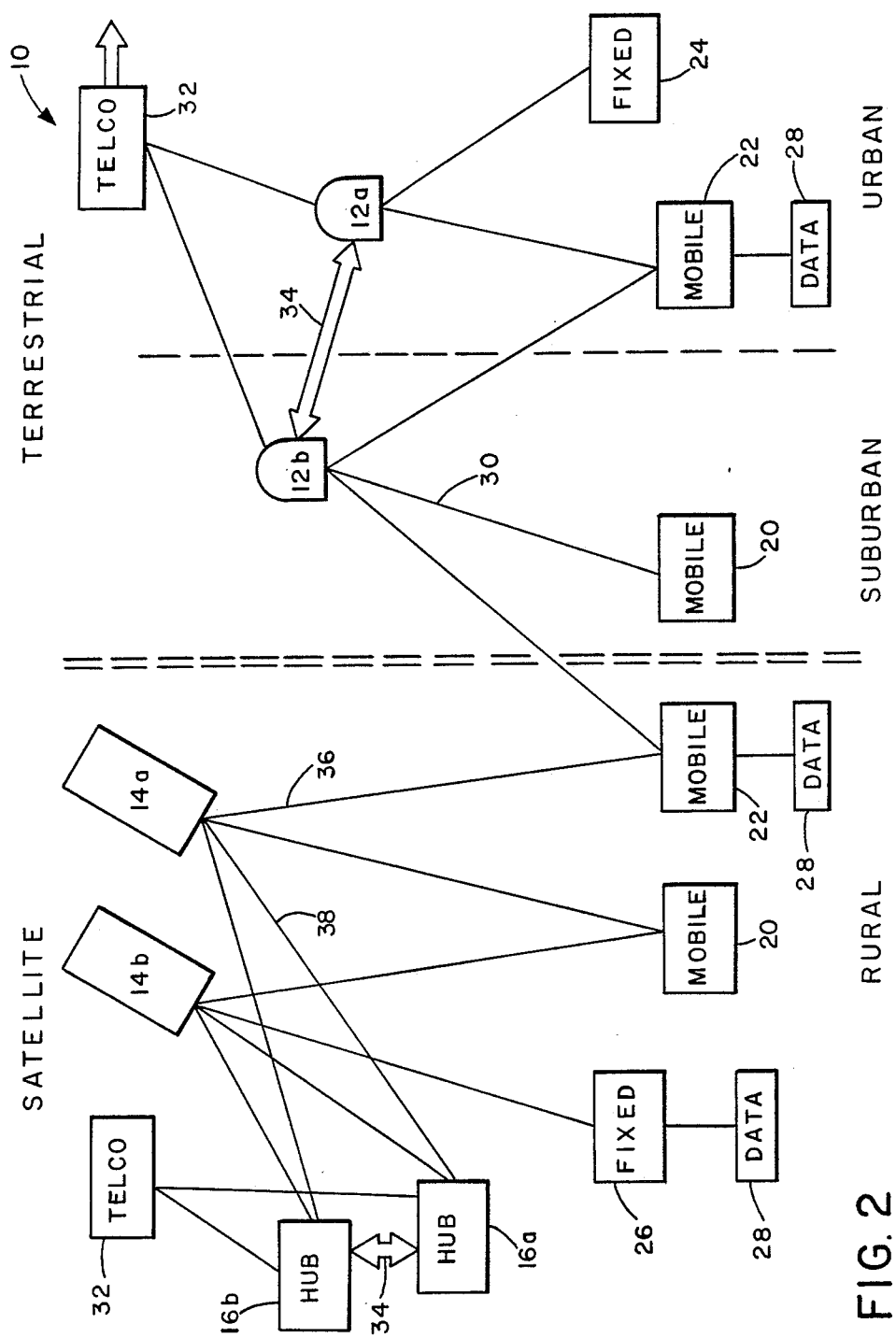
FIG. 2 is an overview of a communication system constructed according to the principles of the present invention.

An overall schematic of a communication system operating according to the principles of the present invention is illustrated in FIG. 2 In FIG. 2, a spread spectrum communication system 10 employs terrestrial repeaters 12 or orbital repeaters 14 with one or more central stations 16, to transmit and receive information to or from mobile terminals 20, or 22, and fixed terminals 24 or 26.

The term information is used to encompass both digital data and voice since some terminals will transmit, or be equipped to transmit, signals in the form of digital data as well as the typical analog or voice signals Transmission of digital data is generally accomplished using an appropriate interface for linking a data generation source 28, such as a TTY device or computer, with the user terminal 22 or 26 circuitry. Modems and other data communication interface devices are readily designed and understood by those skilled in the art and are not described in detail here.

The preferred embodiment of the communication system 10 makes extensive use of the mobile terminals 20 or 22 since the fixed terminals 24 or 26 provide less of an advantage in large urban areas where high quality "wire borne" communication links are easily and cheaply accessed. However, fixed terminals 24 and 26 located in distant or remote locations will gain great advantage from the communication system 10 since terrestrial wire or cable based links are prohibitively expensive, difficult to install, or even non-existent in many areas.

The communication system 10 uses, or evolves in stages to use, several alternative paths for communication. An initial communication system 10 installation would perhaps use exclusively terrestrially based repeaters 12 which communicate with and relay information between the terminals 20, 22, or 24. This is illustrated by the portion of system 10 to the right of the double dashed line dividing the system 10 into two parts, a terrestrial portion and a satellite portion. The earth based repeater 12 of the present invention advances the communication art by providing improved high quality, high capacity communications. However, the terrestrial portion of the communication system 10 is also constructed to interface with an orbital satellite repeater 14.

The initial system accommodates many remote or mobile users with communication links 30 through terrestrial repeaters 12 that are interlinked by existing telephone networks 32, or through dedicated fiber optic or radio communication links 34. Then when a satellite is launched, the communication system 10 uses satellite links 36 to interconnect users, especially rural users. Later on additional satellite repeaters 14 are launched to provide improved communications and higher system capacity. Additional control and signal processing is preferably provided in the satellite portion by using central ground stations or hubs 16 via satellite links 38.

This makes the communication system 10 highly flexible and advantageous for handling a variety of communication needs and services. The communication system 10 accommodates a larger user base or geographical service area commensurate with governmental agency approval and satellite development and launch timing.

This dual system has additional advantages over current systems, both in terms of universal service and interference. Universal service allows users to move freely throughout the system and have communications regardless of location. That is, mobile access is provided to users that switch between rural, suburban, or urban areas, and land, aeronautical, or water based forms of travel. This service is provided on individual, low cost user terminals without equipment alteration. This also means that users have communication system 10 access even when out of normal "home coverage" area provided by a cellular arrangement.

The communication system 10 can be configured as a cellular system using varied cell sizes with larger cells positioned adjacent to many smaller cells. While this decreases the amount of frequency reuse, it will not be a substantial limitation for the communication system 10 due to its greatly increased frequency reuse capabilities. It can accommodate such a limitation or loss of reuse and still serve more users than previous communication systems. The communication system 10 does not require the same guard cells or spaces for frequency reuse as previously seen in cellular systems.

As previously discussed, current communication systems such as cellular telephone, or mobile radio, are SCPC or single channel per carrier FDMA systems that divide the overall spectrum into discrete channels or frequencies for each user or communication link. These communication systems employ AM or FM modulation techniques that generally require minimum attenuation between users on the order of 15 dB for FM to 30 dB or more for AM.

The communication system 10 uses spread spectrum signal transmission techniques to increase user capacity by establishing coded digital communication signals that use quasi-orthogonal bit sequences to decrease mutual interference. At the same time, the communication channels are spread across or occupy the entire allocation bandwidth, which improves communication quality, allows for increased bandwidth signals and decreases the effects of frequency selective fading.

Spread spectrum communication involves processing the outgoing information signal with a spreading function which changes or expands a narrow bandwidth signal into a broad bandwidth signal. The spreading function is a reproducible function which spreads the narrow bandwidth transmission signal over a broader bandwidth and reduces the peak spectral density of the signal. This is direct sequence spread spectrum coding. Alternatively, the carrier frequency can be pseudo-randomly hopped over the spread bandwidth. Direct sequence spread spectrum is preferred for applications addressing multipath impairments.

In the communication system 10, this is accomplished by converting analog input information signals, such as voice, into digital form and multiplying them by a high bandwidth high frequency digital spreading signal. Digital input signals can be directly spread. The resulting spread spectrum signal is then used to modulate a carrier and create a communication signal. It is also possible to modulate the carrier first and then apply the spreading function but for the preferred embodiment the first approach is used for ease in digital processing.

The high bandwidth spreading signal comprises a deterministic series of bits of period $T_c$ referred to in the art as chips. The chips or chip sequences are generated using electronic apparatus and techniques known to those skilled in the art. There are a variety of techniques as well as known coding formulas for generating spread spectrum chip sequences. Exemplary techniques or methods are described in further detail in SPREAD SPECTRUM COMMUNICATIONS, Volume 1 by M. K. Simon et al, Chapter 5, pages 262-358 which is incorporated herein by reference.

The chips are generated at a much higher frequency than the input voice or data signal. By generating the chips at this higher frequency, a series of chips are generated for every single information bit The specific chip frequency used depends on the allocation bandwidth for the communication system 10. It is desirable to spread the communication signal to cover the entire allocated bandwidth where possible and achieve a high processing gain, as discussed below. Also, the higher the chip rate the more users a spread spectrum communication system can service since higher rates generate more chips per information bit and more quasi-orthogonal codes with which to differentiate between users.

For a spectral allocation bandwidth of 9 MHz and using a fifth order elliptical filter to process the spreading signal, a chip frequency of approximately 8 MHz would be used to provide a signal having a 2 dB pass band ripple and 30 dB stop band attenuation. This frequency provides long chip sequences, which provides a large number of discrete addresses or codes for differentiating between users.

The communication system 10 uses Code Division Multiple Access (CDMA) signals to increase the user capacity of the system. This is done by assigning each user a specific code in the chip sequences so that the cross-correlation function between users is small and the users are said to be quasi-orthogonal to each other. As previously stated, there are known coding functions which can be used to determine or generate a family of codes or chip sequences. An exemplary set would be the GOLD codes which are also discussed in the previously mentioned SPREAD SPECTRUM COMMUNICATIONS reference.

Figure 3:
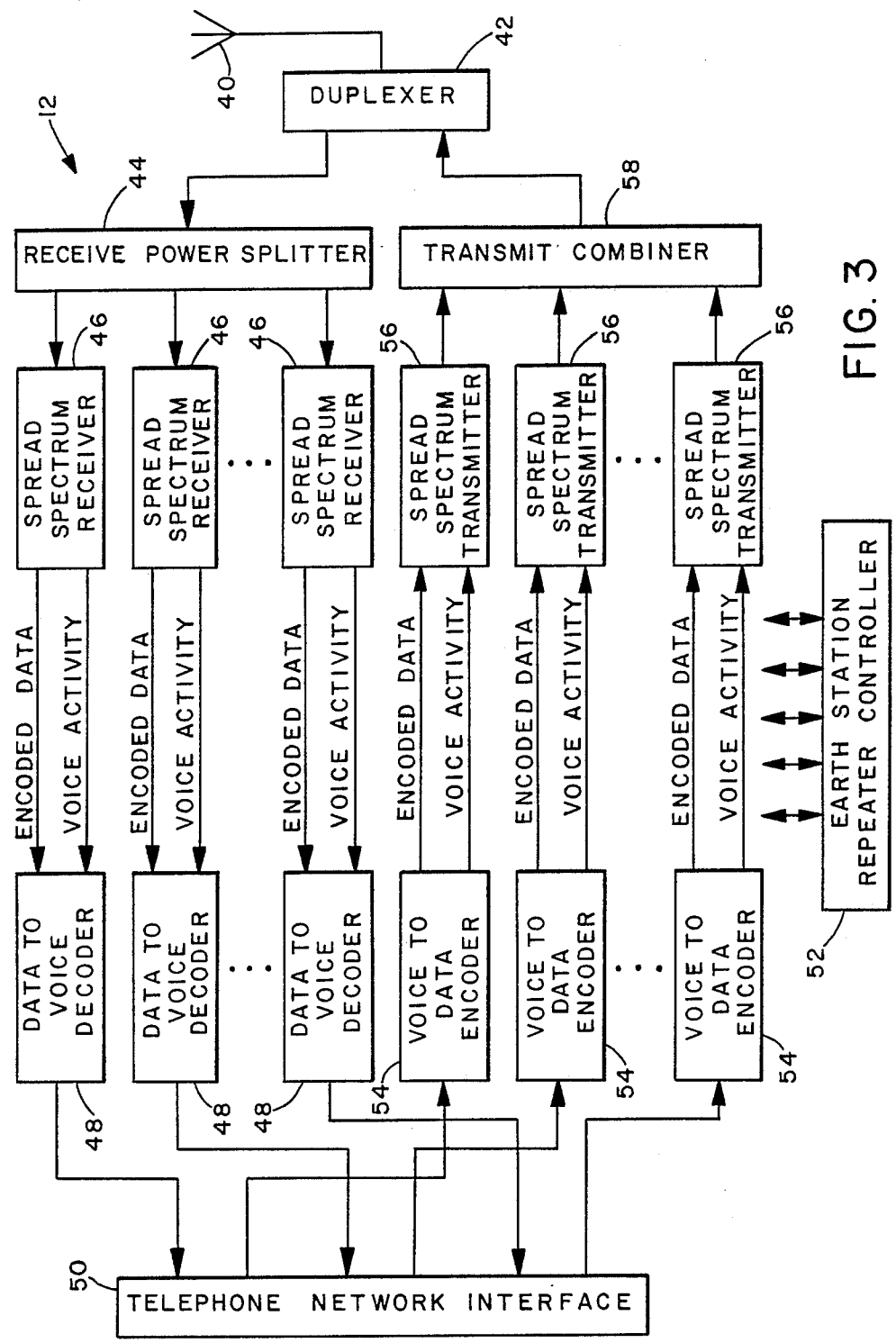
FIG. 3, is a schematic of a repeater employed in the system of FIG. 1 using an omni-directional antenna.

The chip sequences can be generated or chosen so that a predetermined or unique chip sequence is assigned to a specific user for the entire time a user terminal is used in the communication system 10 or assigned each time the user starts a communication link as part of the call setup protocol. This, of course, means maintaining a central log or listing of all user chip sequence assignments The earth based or terrestrial repeater 12 of the communication system 10 is illustrated schematically in FIG. 3. In FIG. 3, the repeater 12, which can be located in a rural or urban region, employs an antenna 40 to receive or transmit communication signals. The antenna 40 is coupled to a duplexer 42 which allows coupling the antenna to both the transmit and receive sections or modes of the repeater 12. This simplifies the antenna design and installation by using a single antenna structure as opposed to two. However, it is not necessary for the function of the present invention to use a single antenna.

The duplexer 42 transfers incoming or received communication signals through a receive power splitter 44 to spread spectrum receivers 46, each of which will handle a specific user or communication link. Therefore, each repeater will employ as many spread spectrum receivers as users or communication links it is expected to accommodate at a given time. The receivers 46 contain circuitry to change the incoming communication signals to a lower IF frequency and track and lock onto the signal. The receivers 46 then remove the carrier and despread the signals to provide a digitally encoded signal. The encoded signal is then transferred to data-to-voice decoders 48 where they are changed to analog or voice signals for use over a terrestrially based link. In FIG. 3 a telephone network interface 50 is used to couple the voice signals to telephone lines for transfer to other locations. In the alternative, a fiber optic coupler, not shown, could be used to couple signals into a fiber optic communication cable. The interface and fiber optic couplers represent devices that are commercially available and designed by those skilled in the art of terrestrial communication systems.

The repeater 12 may also communicate incoming signals directly with other mobile users within the region it is servicing. In this case, a repeater controller 52, which can comprise microprocessor controllers and circuitry, routes the decoded communication signal to the user that is specified in the communication protocol (chip sequence assignment). Both users for this communication link are assigned specific receivers and transmitters. Previously each user was assigned a specific channel. The term channel can still be used for the communication system 10 out it now refers to a percentage of the overall power of the system. Every user generally occupies the whole spectrum used by the repeater but is allocated only a portion of the power available to the repeater, determined by the minimum amount of power required to establish and maintain a communication link In the preferred embodiment the overall spectral allocation is divided in half with one half used for the uplink portion and the other half used for the downlink portion of communication links.

Figure 4:
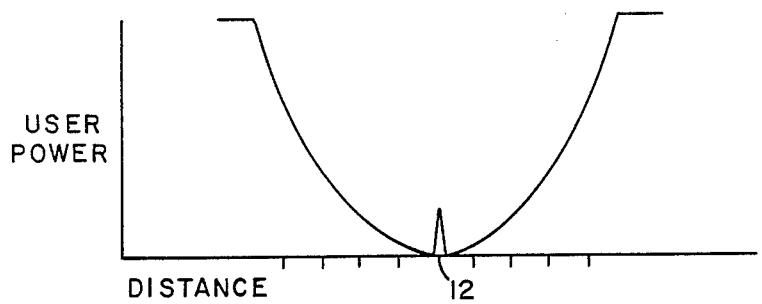
FIG. 4 is a graphic plot of average user power to establish a communication link versus the distance from a terrestrial repeater.

By using this type of power control the amount of power required for maintaining communications with users decreases as the users are closer to the repeater based on the attenuation of radio waves over distance. The effect of the power decrease is illustrated in FIG. 4 where a plot of average power used to make a communication link versus distance from the repeater is shown. It can be further shown that for this type of distribution the total power required for the repeater is decreased almost by a factor of 2. This decrease can be used to reduce the power requirements for the repeater or to increase the capacity by a factor of 2 for the same power requirements. This reduction of power also reduces interference in neighboring cells.

Returning to FIG. 3, information signals, either from the terrestrial link or another "local" user, are transferred back through voice to data encoders 54 to transmitters 56. In the transmitters 56 the digitally coded signals are spread and used to modulate a carrier to form the desired communication signal. The communication signal is now transferred through the transmitter power combiner 58 and duplexer 42 to antenna 40.

For communication signals remaining within the region serviced by the repeater 12, the preferred system of the present invention would not route intermediate versions of the signals through the digital decoders 48 and encoders 54. Instead the signals are transferred directly between the receivers 46 and transmitters 56 only providing so much of the decoding as necessary to change the spread spectrum code assignment rather than actual conversion to analog form.

The repeater of the present invention can transfer a single communication signal to as many users as desired without requiring duplication of the signal. In this regard the protocol used for the sending of messages can accommodate an indication of multiple users in the address Therefore, for some services one message can be detected by the receivers 46 and quickly transferred directly to several transmitters 56 for reception by several users. This is the so called one to many form of transfer useful for some types of dispatch and data transfers. The repeater can also easily accommodate the reverse, where several communication signals are transferred to a single receiver. The many to one type of transfer.

Another advance over the art for the repeater 12 is the inclusion of a voice activity detector in the circuitry. This detector monitors the activity of signals processed by the circuit to decrease the power utilized in the absence of communication. In a CDMA communication system it is possible to employ fast attack, threshold sensitive, detectors that can decrease the signal level, energy, or transmitter power used during periods as brief as between syllables in conversation. FDMA and TDMA communication systems cannot reassign channels or take similar steps in this short a time period. For pauses during digital data transmission this is equally applicable. The power reduction is accomplished by gating off the transmitter except for brief, periodic bursts to maintain synchronization. This can be accomplished by generating a control signal which alters the duty cycle of power output circuitry.

The activity detection and power control results in a net savings of energy usage for the communication system 10. It is estimated that as much as 40 percent of the total time consumed by a typical conversation can be treated as "dead" time. The bit error rate and signal quality for each user is determined by $E_b/I_o$ on an instantaneous basis. Therefore, if some of the interference is gated off then $I_o$ decreases and the remaining user interference also decreases which in turn increases system capacity. The resulting reduction in average power per user is also important for the orbital repeaters 14 which operate in a power limited environment.

The elimination of about 40 percent of the "conversational" dead time in the communication system 10 increases the system capacity by as much as $2\frac{1}{2}$ times. This increase in system capacity or number of communication channels is not possible with FDMA and TDMA communication systems because of the difficulty in switching busy or active channels into idle channels during conversational pauses. In addition, the inherent time delay imposed by signal transit times, makes coordination of such signal switching for use in the uplink portion of a communication link impossible in satellite FDMA or TDMA systems.

Additional advantages are realized if an antenna array is used for the repeater 12. The antenna array of the preferred embodiment forms multiple steerable beams that are directed to specific users which increases the isolation between users. This is shown schematically in FIG. 5 where a phased array repeater 60 uses the intrinsic properties of a phased array to create beam directionality and also multiple beams which can be directed to specific users or user regions. The modems 64 comprise the circuitry previously shown in FIG. 3 above, with the exception of the antenna 40. The antenna now employs a different structure and some new control elements.

Signals that were previously transferred to a single antenna 40 are now transferred to a beam former 62. The number of beam formers 62 used in the repeater 60 depends upon the amount of control desired over the communications to individual users versus the cost and complexity that can be accommodated. The more beam formers used, the greater amount of control that can be exercised over each communication link from the modems. The maximum number of beam formers used would correspond to the number of modems and provide optimal control over user communications. However, this is overly complex for most communication uses.

Each beam former transfers signals from its associated transmitters in the modems 64 to a series of antenna elements 66 comprising a phased array 68. As will be apparent to those skilled in the art, the phased array antenna functions by controlling the relative phase of the signals transmitted by the individual elements 66 to form a beam along a specific direction. By controlling the relative phase of the transmission of signals from the elements 66, the transmissions are summed in space to form a single beam traveling along a particular direction Controlling the phase of the elements controls the resulting beam direction.

Figure 7:
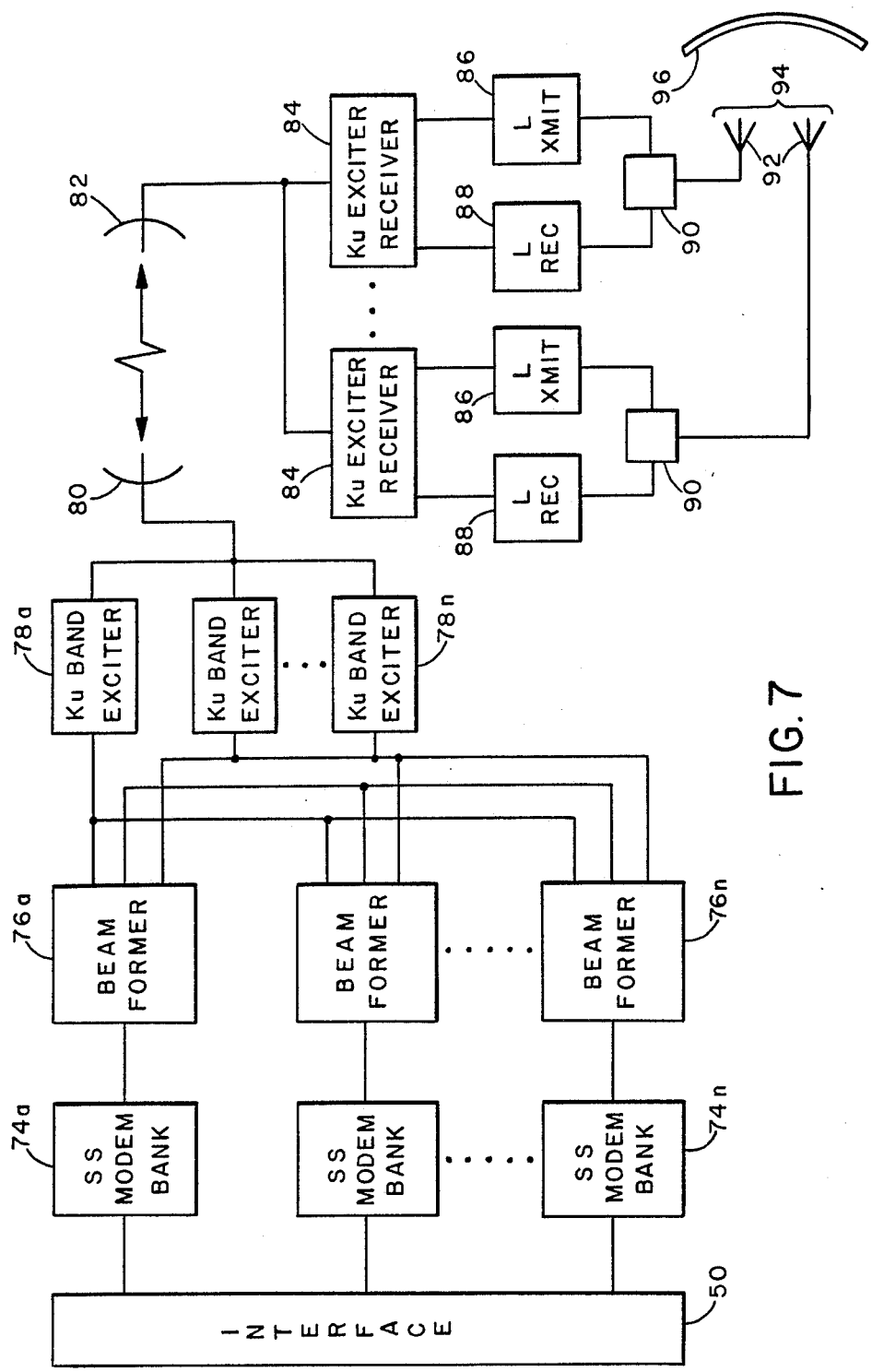
FIG. 7 is a schematic of an orbital repeater and a communication system hub used in the system of FIG. 2.

Each beam former 62 is designed to transmit signals along a specific beam pattern or patterns. The beam formers 62 accept signals from the modems 64 and create as many duplicate or parallel signals from each single communication signal as there are antenna elements 66. In FIG. 7 three elements are shown for purposes of illustration only. The preferred embodiment of the communication system 10 uses from 6 to 15 elements in a two dimensional array or pattern, but is not limited to these numbers. The number used depends upon the amount of frequency reuse that is desired, realistic attenuation limitations, and the allowable complexity of the repeater 60.

The beam formers 62 then alter the phase of the parallel signals using techniques known in the electronics arts and transfer these signals to the antenna elements 66. At the same time, the outputs from each of the beam formers 62 is summed by digital combiners 70. This is done so that all of the power intended for each element is summed and transferred to that element and the transfer is isolated from returning through adjacent beam formers. This allows for multiple beams to be formed and directed by the array simultaneously by the beam formers 62.

It is further possible to permanently assign receivers and transmitters to the beam formers so that they function to handle communications within preselected regions or along dedicated communication links. While dedicated communication links tend to decrease the capacity of the communication system 10, there are priority users such as emergency services that often require or demand this kind of service.

The phased array of the repeater 60 is also equally useful for scanning a region or directing a receiving pattern to detect specific regions or users The scan pattern for the array can be predetermined by the assignment of receivers to monitor specific regions or directions. However, the array of the present invention is not limited to static assignments. An antenna controller 72 provides signals to the beam formers 62 which alters the directional assignment used by each beam former. In this manner new steerable beams can be created or additional beams directed into regions where increased user capacity is needed. Also, incoming signals can be detected in terms of the phase relationship required for the highest strength. The phase of the array can be periodically scanned or slightly adjusted to provide this information. Then the same phase relationship can be used in the array for the return signals to that user. In this manner not only can improved communication be obtained over the reception link but also for the transmission link.

The communication system 10, as previously discussed in relationship to the illustration of FIG. 2, can employ a series of terrestrial and satellite repeaters to form a large interlinked communication system. As shown in FIG. 1, repeaters 12 can be subdivided into the repeaters 12a and 12b as well as the satellites 14a and 14b.

The terrestrial based repeaters 12a serve high user density urban or metropolitan areas while the terrestrial based repeaters 12b serve larger but lower density urban or sub-urban regions. The orbital repeaters or satellites 14a and 14b serve even larger geographical regions which are rural and low user density. While this is a preferred allocation of resources for the present invention, it is not the only possible allocation. For example, the orbital repeaters 14a or 14b can be used to service metropolitan areas where it is economically unreasonable to establish central base stations This may also prove advantageous where it is desirable to have direct communication links between certain metropolitan users and rural users without any intermediary communication service links.

Another important feature of the communication system 10 is ability of the terrestrial repeaters, especially in the high user density metropolitan areas to "offload" local users from the satellite repeaters. That is, as users come within range of terrestrial repeaters they are linked through those repeaters preferentially. Note that the communication system 10 allows this to be a preferential transfer. If desired the user can continue to use the orbital repeater even though the terrestrial repeater is close by. This allows for improved communications where there is severe signal degradation due to fading, multipath, or direct blockage from the nearby terrestrial repeater.

Figure 6:
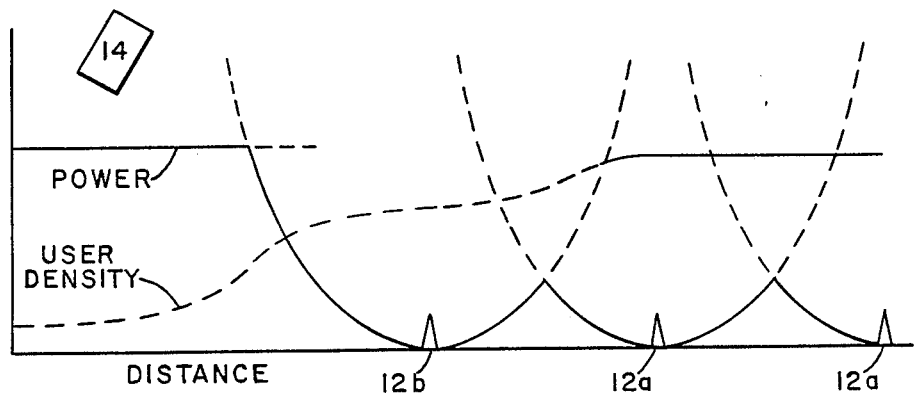
FIG. 6 is a graphic plot of average user power versus the distance from a repeater.

The switch over to a terrestrial repeater now means that as the user moves closer to a repeater, less power is required for the communication link due to the simple power versus distance relationships previously discussed. This is illustrated in FIG. 6, where a plot of power requirements for a user link versus distance from a repeater is shown. In addition, an assumed user density is also plotted to provide an idea of the amount of power savings for the system. The fact that less power is required for the communication link also means that less power is being radiated in the system to create interference for other users. This synergistic relationship between the repeaters and the user access improves power considerations as well as capacity for the overall system 10.

The communication system 10 is very flexible and the orbital repeater assignments as to regions served can be altered to match current market demands for services This is another advance provided by the present invention.

The satellite or orbital repeaters 14 of FIG. 2 can be configured in two different modes of operation. The first mode is the direct user link mode in which the satellite receives and transmits directly with users. The second mode is the central hub mode in which communications to and from users are routed through a terrestrially based hub.

Figure 5:
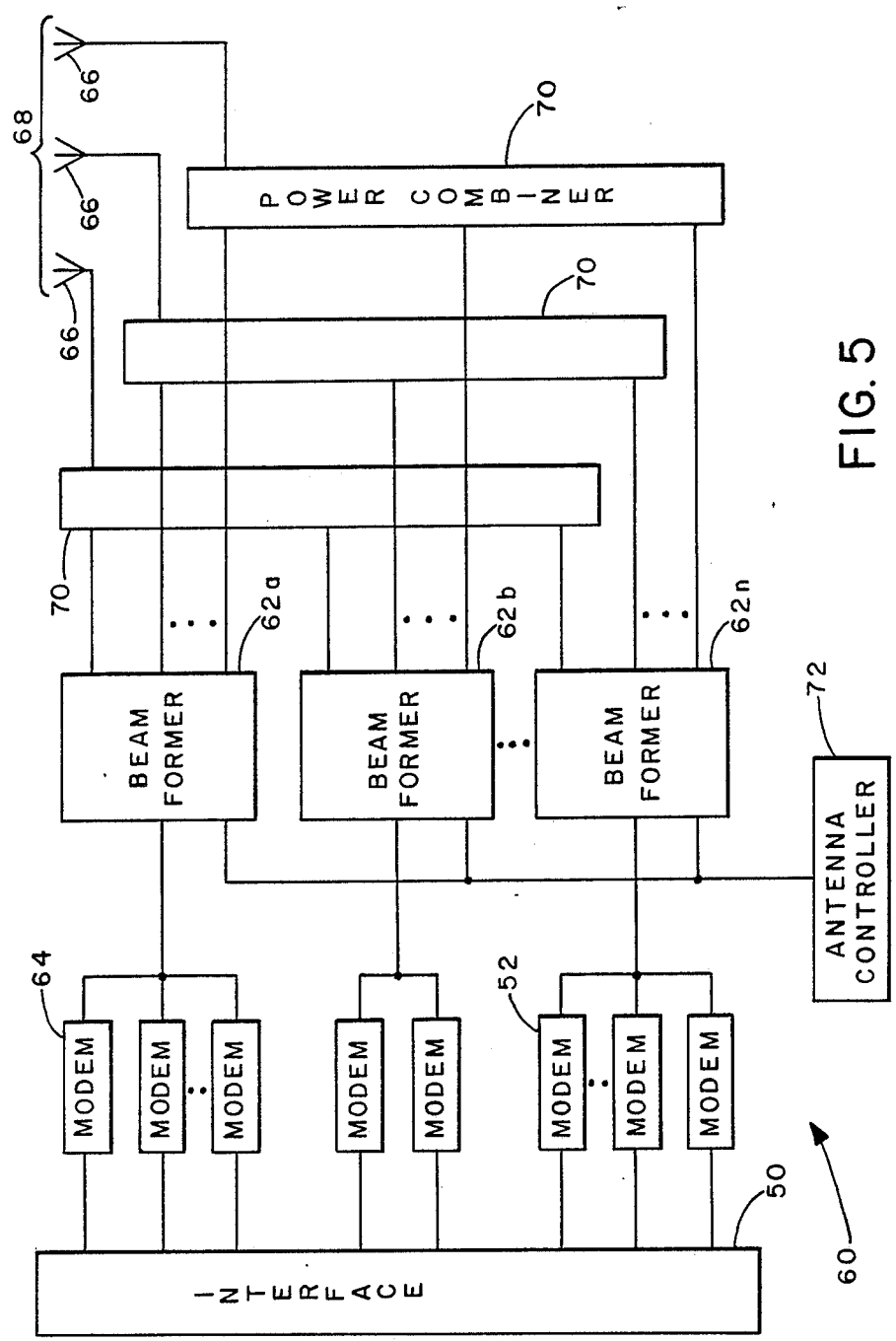
FIG. 5 is a schematic of another repeater employed in the system of FIG. 2 using a phased array antenna structure.

In the direct user mode the satellite will employ a circuit similar to that shown for the terrestrial repeater in FIG. 5. The differences being the specific types of antennas and the fact that communication signals are not interfaced directly to a terrestrial service such as a telephone system. If the satellite employs the circuitry of FIG. 5, advanced VLSI and hybrid circuit techniques would be used to reduce the size and power consumption of the circuits.

While the orbital repeaters 14 can use the same basic circuitry as used in the terrestrial repeater, it is very desirable to employ as few circuits as possible in a satellite. It is desirable to have the satellite as much a passive relay as possible and use as little power as possible. Therefore, the preferable embodiment for the repeaters 14 utilizes a hub or control center 16 through which the communications will be passed and processed. This allows decreased power consumption in the satellite and greater system reliability by maintaining the banks of receivers and transmitters needed for the individual communication links on the ground.

This is shown schematically in greater detail in FIG. 7. In FIG. 7, hub 16 uses the same basic arrangement of transmitters and receivers as seen in the repeater 60 as illustrated in FIG. 5. Spread spectrum receivers and transmitters as previously described, are shown as Spread Spectrum (SS) modem banks 74 because of the manner in which they are grouped together as shown FIG. 5. Each bank of modems is connected on one hand to an interface 50 for a terrestrial communication link such as a telephone system or an optical fiber cable. Not illustrated in FIG. 7 are the voice and data encoders and decoders that would be used in association with the modems of the modem banks 74.

The modem banks 74 are connected to beam formers 76 which serve to generate the signals necessary to form directed or steerable multiple beams as seen in FIG. 5. However, the output of the beam formers 76 are connected to an array of frequency upconverters 78 rather than power combiners or antenna elements In essence, each satellite antenna element is provided with its own channel between the hub beam former and the antenna array. When polarization reuse is employed, the horizontal and vertical array elements are provided with separate channels to the beam former so that both right and left handed circularly polarized beams can be formed.

The signals provided by the upconverters 78 are communicated through a Ku band antenna 80 to an associated Ku band antenna 82 residing on an orbital repeater 14. This Ku band link between the satellite 14 and the hub 16 has several advantages over an L band link. The Ku band frequencies which are on the order of 14 GHz, do not interfere with the spectral allocations of the rest of the communication system 10. This helps maintain system capacity by not consuming a portion of the power requirements for the system in these links. Another advantage of the present Ku band link is that the upconverters employ FM modulation techniques. This allows improved phase control over the signals as they traverse the long distance to a satellite and decreases the necessary control, signal processing, and complexity required in the orbital repeater to maintain high quality multiple in-phase communication links.

However, single sideband AM modulation is easier to implement where there are two or more hubs 16 which share the resources of the satellites When two hubs communicate with the satellites at the same time, AM signals are easier to coordinate in the system.

In the orbital repeater 14 the received Ku band signals are detected and downconverted by Ku band transceivers 84 The signals are then transferred to L band transmitters 86 where they are amplified to controlled power levels and sent through duplexers 90 to the antenna elements 92.

As in the case of the earth based repeater 12, the antenna elements 92 form a two dimensional phased array 94 which provides multiple steerable beams for the communication system 10. It will be apparent to those skilled in the art that direct radiation of the earth by an array of 12 to 15 elements, as preferred, from geosynchronous orbit is impractical. The solution is to use a reflector 96 to create the desired pattern of focused beams at the planet surface.

It is possible to use a single antenna or even multiple antennas on the orbital repeater 14 and nave a functional repeater. However, the preferred antenna structure provides many advantages over previous communication system designs in terms of capacity, regional control, special users services, etc., as discussed above. The multiple steerable beams formed by the array 94 can be directed to specific regions, or classes of users. As in the case of the terrestrial repeater, the direction of the steerable beams can be controlled by the hub 16 to reassign satellite coverage to new regions (size or location).

Communication signals traveling to the orbital repeater 14 from users will be detected by the array 94 provided they are in proper phase relationship to the tuning of the array. Received signals will be transferred through the duplexer 90 to the L band receivers 88. The signal is transferred to the Ku band transceiver 84 where it is upconverted and sent to the hub 16. Each of the receivers 88 is configured to receive the full bandwidth of the spectrum allocated to the communication system 10. However, for specific applications some receivers 88 could be limited to specific portions of the band to provide limited coverage of select regions or to accept or reject special dedicated services.

The hub 16 also employs the voice activity circuits previously described in order to decrease the power consumed by "empty" communication signals and increase capacity. Clearly this also decreases the power needlessly consumed by an orbital repeater, helping to increase the effective use of satellite power. The system capacity is increased due to the effects previously discussed with respect to activity detection and power control in the terrestrial repeater 12.

Another feature of the hub 16 is that it allows the communication system 10 to use multiple satellites or orbital repeaters 14 in a new advantageous configuration to achieve improved communication and orbital reuse. In addition, this is accomplished without increasing the complexity of the user terminal or requiring alternate types of terminals.

In conventional reuse, the hub 16 directs the satellites 14a and 14b to cover differing geographical regions by directing multiple steerable beams to specific locations simultaneously. In this manner the satellites are "reused" in that they can accommodate the same frequencies without concern for interference because of the isolation provided by the antenna structures.

Figure 8:
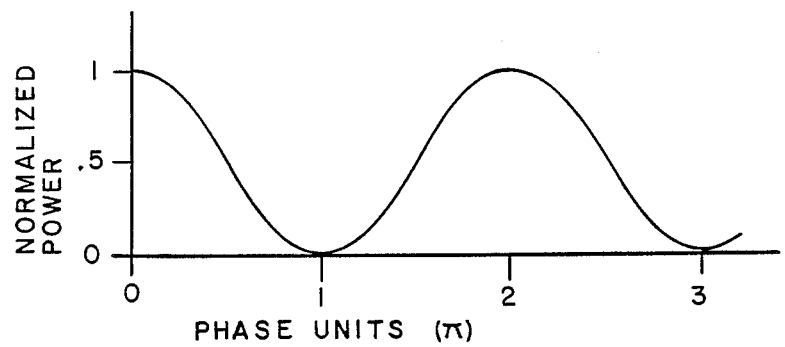
FIG. 8 is a plot of relative signal strength versus position for a satellite interference pattern.

Orbital reuse is provided in the communication system 10 even though the user terminals employ omnidirectional antennas. Unlike previous systems, fixed directional antennas are not required because the system 10 uses two or more satellites in a new coincident transmission configuration that can be thought of as a very large scale interferometer. This is made possible by the marginal isolation provided by the two satellites in conjunction with spread-spectrum modulation In this operational mode the satellites each transmit an appropriate communication signal to the earth, both intended for the same user. The radio waves have relative phase variations due to path differences between the two satellites and the user. The two beams will form an interference pattern across the geographical target area with higher power densities where the beams constructively add and lower densities where they destructively add. This effect is illustrated graphically in FIG. 8 using a normalized value of 1 for the constructive addition of two satellite communication links. If a user is located in an in-phase, higher power density portion then the signal perceived by the user is effectively 3 dB higher than the other user interference which, on the average, receives no gain at the receivers location. This improved signal to interference ratio gain adds additional isolation margin to the communication system 10 and in turn increases the overall capacity For purposes of clarity in illustration the technique of the present invention is illustrated and discussed utilizing two satellites operating in this mode. However, additional satellites can be employed to achieve additional gain, such as 4.8 dB for three satellites, 6 dB for four, and so forth.

To place a user in the higher density portion of the interference pattern, two independent antenna beams are directed toward the user. Users can be "tuned" into the higher density portions of the antenna interference patterns by adjusting the phase and time delay of their signals. This same technique can be used for the uplink side of communication as well as the downlink. Path diversity also provides additional advantages in terms of countering multipath and fading effects.

Figure 9:
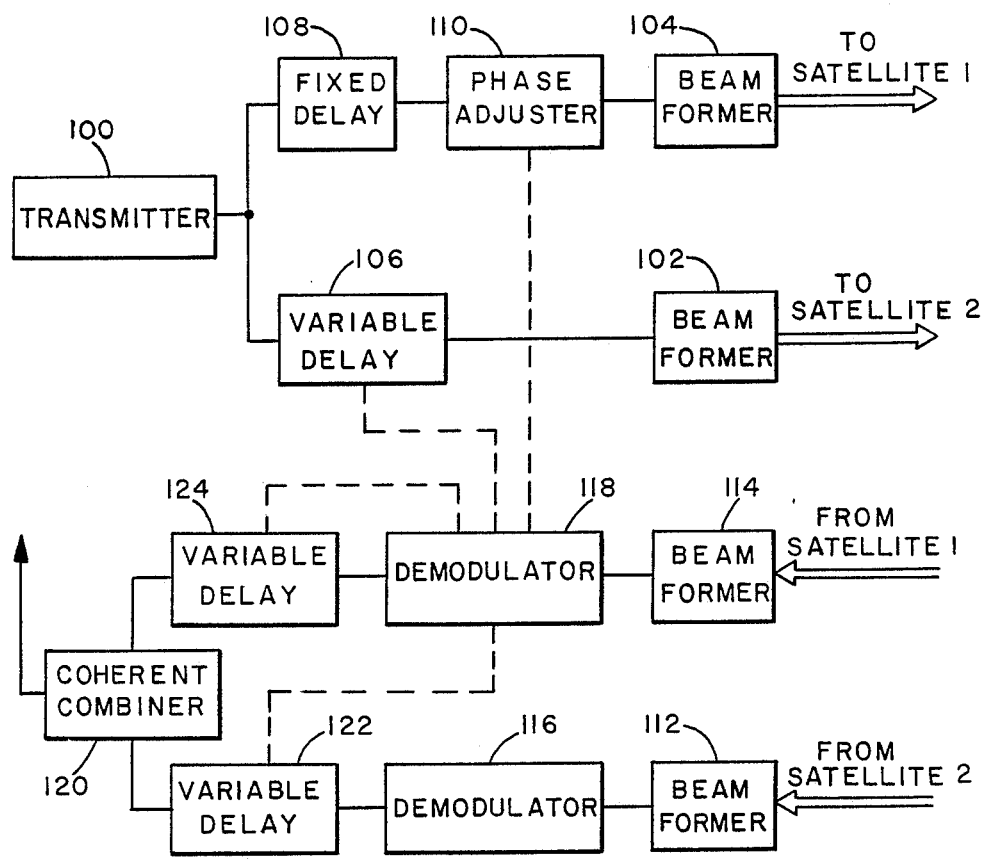
FIG. 9 is a schematic view of a hub interferometer communication link.

The hub 16 circuitry for accomplishing the above operational mode is illustrated in FIG. 9. In FIG. 9 a modem or transmitter 100 provides a communication signal to two beam formers 102 and 104 at the same time. However, the delay devices 106 and 108 are disposed in the transmission links for the beam formers 102 and 104, respectively. The beam formers operate as previously described. Only two beam formers are shown for illustration, it being understood that the hub 16 may employ a large number of beam formers as previously discussed.

One of the delay devices can provide a fixed delay while the other provides a variable length delay, since the relative delay is what is important. Alternatively, both delay devices 106, 108 can provide variable delay. The delay devices 106, 108 establish the relative time delay between the transmitted satellite signals A phase adjuster 110 is also disposed in the communication link, here for beam former 104, to adjust the relative phase.

The signals from the beam formers 102, 104 are transmitted, as before, through frequency converters to the satellites. The signals from each beam former 102 or 104 are transmitted to different satellites where they are directed to a user, resulting in the desired interference pattern.

For the uplink communication signals from the respective system 10 users, the beam formers 112 and 114 act as receiving elements for the separate demodulators or receivers 116 and 118. Incoming communication signals are transferred to the demodulators where they are despread into digital communication signals. In order to coherently combine the resulting signals a coherent combiner 120 is coupled to the output of the demodulators 116 and 118. Delay devices 122 and 124 are positioned between the combiner 120 and the demodulators 116 and 118 to adjust the relative phase and timing of the signals into coherence. Once the signals are coherently combined into a single digital communication signal, the information is transferred to appropriate decoding circuitry for further processing.

The control over the phase and time delay for a given user depends on the quality or strength of the signals received by the hub 16. This information is derived from the demodulators 116, 118 and provided to the variable delay devices 106, 122, 124, and the phase controller 110.

The hub 16 is capable of monitoring communication from both satellites simultaneously In this case, each communication link between the user and a satellite is treated as a separate link which is assigned separate receivers, decoders, etc. The hub 16 determines the relative phase and time delay difference between the two signals. This information provides signals to delay and rotate the separately detected and decoded signals into coherence or phase with respect to each other and coherently summed to produce a single output. This process provides approximately an additional 3 dB of gain. Interference from other users' signals adds incoherently producing 0 dB gain on the average.

Alternatively, the hub 16 utilizes the user assignment protocol in the communication links to determine that more than one link is in use. Then the hub compares the relative power or quality of each link. The link that provides the best error free, high power signal is retained and the other communication link forced, under hub processor control, to terminate. The terminated link has its associated receivers, transmitters, and steerable beam reassigned to a new user. This technique chooses the best communication path to account for path interference and fading without tying up additional equipment.

It should be readily understood by those skilled in the art that using a central control facility with the terrestrially based repeaters for monitoring and controlling the assignment of communication links will also provide the same multipath abilities. This is advantageous in environments where such obstructions as terrain, buildings and trees tend to alter the best path and the nature of the communication paths on a frequent basis.

Figure 10:
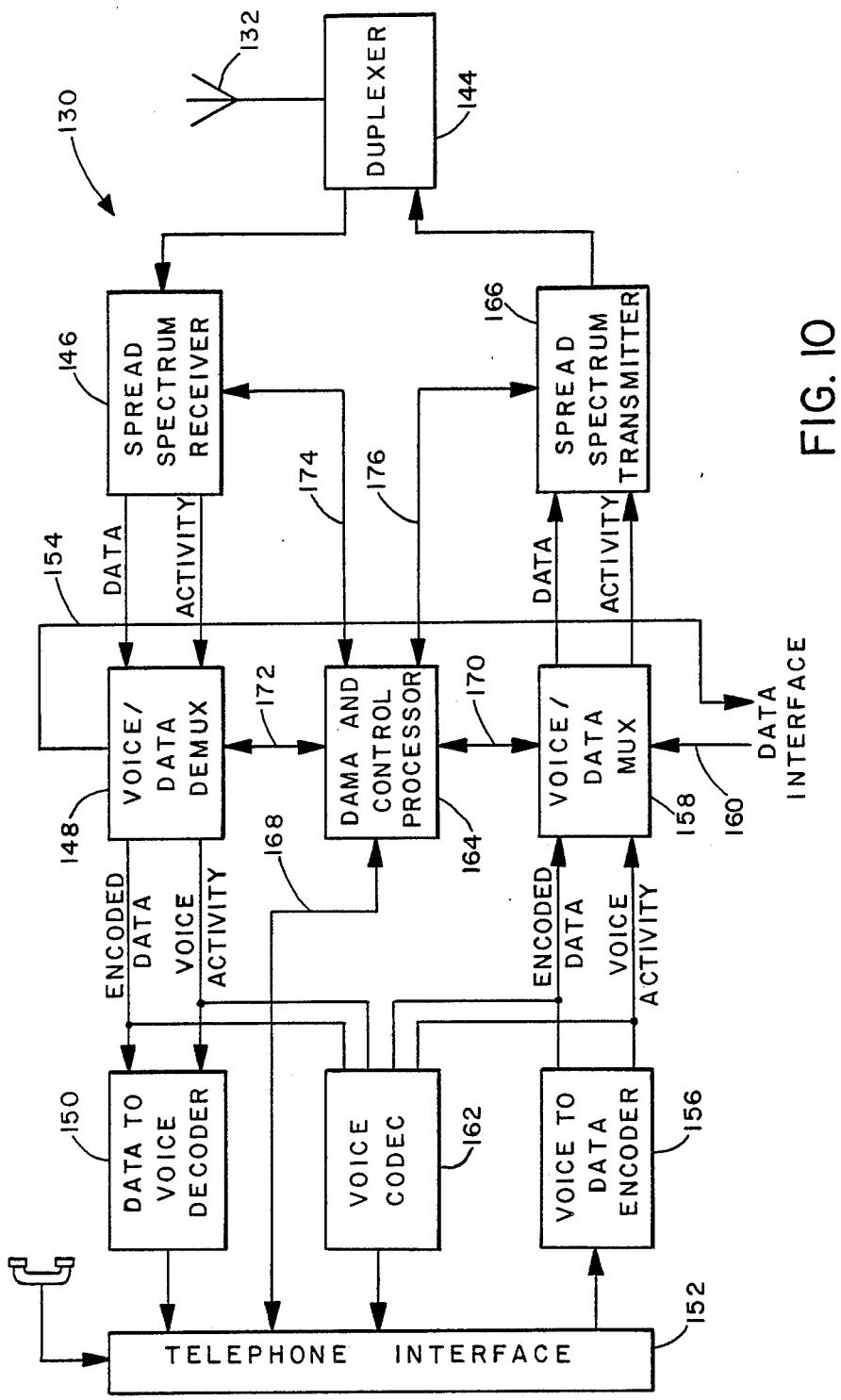
FIG. 10 is a schematic of the user terminal employed in the system of FIG. 2.

The communication signals used in the communication system 10 are transferred by the repeaters 12 or 14 between the individual user terminals 20, 22, 24, or 26, as previously illustrated Such terminals can in turn interface to terrestrially based communication systems or other multi-user systems. An exemplary user terminal circuit employed in the system 10 is schematically illustrated in FIG. 10.

The user terminal 130 of FIG. 9 utilizes an antenna 132 to receive and transmit communication signals which are transferred through a duplexer 144 to or from a spread spectrum receiver 146 or transmitter 166, respectively. These elements function in the same manner as those elements previously described in relation to the repeater 12 or 14 circuitry of FIG.'s 2 through 7.

The antenna used by each system 10 user will vary according to the type of service desired. A larger antenna structure can be used for fixed user terminals than for mobile users. In this case small to medium sized dish-type antennas are employed to isolate communication with one satellite and free the hub from having to make this decision or assignment. However, the communication system 10 is intended to serve a large number of users that are either truly mobile or are unable to utilize even moderately sized (2 to 4 foot diameter) antenna dishes.

Figure 11:
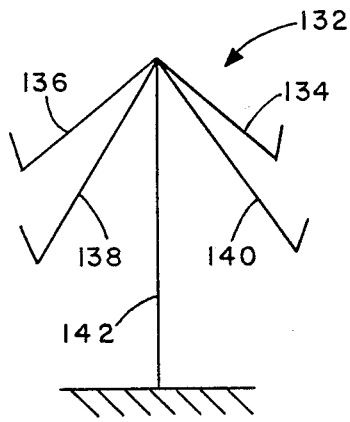
FIG. 11 is a view of an antenna for use in the system of FIG. 2.

In this latter application a small omni-directional antenna is contemplated. Omni-directional in this application means omni-directional in the horizontal direction. For satellite relay applications, there is a slight gain on the order of 5 dB isotropic at about 30 degrees elevation so that the antenna will direct its energy or be selective to receive energy from an elevated position. This decreases interference from energy sources that are at horizon level as would be true for adjacent cells or unrelated satellite systems. An exemplary antenna configuration is the "droopy dipole" and is shown in FIG. 11. An antenna optimized for terrestrial repeaters would preferably have more gain at lower elevation angles.

The antenna 132 of FIG. 11 employs four dipole arms 134, 136, 138, and 140 extending radially outward from a support mast 142. The dipole arms are positioned every 90 degrees around the circumference of a support post and angled downward. The exact dimensions of the antenna elements depend upon the frequency to be transmitted as well as structural considerations for a mobile antenna subjected to wind drag, etc. This type of antenna is known in the communications art and it will be readily apparent to those skilled in the art how to choose the appropriate dimensions.

In order to improve the signal rejection of the antenna 112 and thereby also increase the capacity of the communication system 10, the antenna is preferably operated in a polarization selection mode. As previously discussed, the limiting factor on the capacity of the communication system 10 is the self noise or interference caused by "other" users. If some of the users are operating on another polarization, then the amount of self noise that they contribute is attenuated by the polarization isolation.

Figure 12:
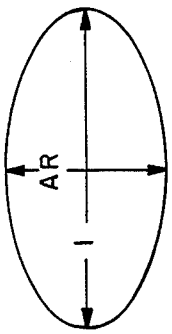
FIG. 12 is an illustration of elliptical ratio.

If the radiation pattern of the transmitter is perfectly circularly polarized, then the axial ratio of the receiving antenna pattern will determine the amount of interference received from an undesired polarization. The axial ratio is defined as the ratio of the minor axis to the major axis of the antenna reception pattern expressed in units of signal power. FIG. 12 shows a typical pattern with an axial ratio of AR.

Ellipticity (EL) expressed in dB is related to the axial ratio by the equation:

$$EL = -10 \, \text{Log}_{10}(AR) \tag{4}$$

From this expression an increase in capacity for the communication system 10 as a function of the axial ratio and ellipticity can be calculated. If the voltage of a desired polarization is defined as $1 + \sqrt{AR}$, then the voltage of the undesired polarization is $1 - \sqrt{AR}$.

The increase in system capacity is the ratio of users in both polarizations to the total number of users when there is no polarization reuse. Because the self noise seen by a terminal with polarization reuse at the system 10 capacity limit equals the self noise with no polarization reuse at the system capacity limit, the following equations can be written and solved for the capacity increase K as a function of the axial ratio AR.

$$1 = \frac{k}{2} + \frac{k}{2}\left(\frac{1 - \sqrt{AR}}{1 + \sqrt{AR}}\right) \tag{5}$$

$$k = \frac{1 + 2\sqrt{AR} + AR}{1 + \sqrt{AR}} \tag{6}$$

$$K = 1 + \sqrt{AR} \tag{7}$$

The relative increase in capacity for polarization reuse is $k-1$ or $\sqrt{AR}$. FIG. 12 presents a plot of $k-1$ versus ellipticity in dB. Table I of FIG. 14 lists the axial ratio, capacity increase, and polarization isolation for ellipticity from 0 to 20 dB.

Because of the unknown orientation of a mobile user and any vehicle it may located in and the need to have some directivity in elevation, it is very difficult to get an ellipticity better than 6-10 dB. This provides a polarization isolation of 9.6–5.7 dB. This is not enough to be usable for FDMA analog or digital systems. However, because of the spread spectrum processing gain, polarization reuse can be used to increase the system 10 capacity even though the polarization isolation is quite small or unusable by other communication systems. This combination of CDMA and polarization reuse can effectively increase the capacity of communication system 10 on the order of 50 to 80 percent.

Circularly polarized antennas are desirable in a mobile system at L-Band or lower frequencies to combat problems with Faraday rotation of the signal. Therefore, the circular polarization technique of the present invention is well suited for the mobile user terminals of the present communication system.

When the antenna 132 is operated in a polarization selection mode, the repeater antenna structure must perform complimentary processing operations. Therefore, the repeaters 12 or 14 may have additional control circuitry associated with the antenna operation to control the polarization of the transmitted and received signals.

As previously discussed, phased array antennas would employ separate beam former channels for horizontal and vertical beam array elements so that left and right handed circularly polarized beams can be transmitted or received.

A polarization control signal, for selecting between the appropriate beam former used by a communication signal and, therefore, polarization modes can be generated according to the communication signal protocol designating specific users. The user polarization mode can be fixed at the time of terminal installation or by optional control circuitry.

Communication signals received on the antenna 132 are transferred to the spread spectrum receiver 146 where they are demodulated and despread to yield a digital communication signal. This digital signal is transferred through a voice/data demultiplexer 148 which separates signals into digitized voice signals or digital data signals.

The digitized voice signals are in turn transferred to a data-to-voice decoder 150 where digitized analog signals are converted to analog form using techniques known in the art. The analog output of the decoder 150, which is generally a voice signal, can be presented to a variety of subsequent circuits through an interface 152. The configuration or construction of the interface 152 depends upon the applications required by the specific user or user terminal. In typical mobile user terminals, analog signals are processed by pre-amplifiers, amplifiers, and other gain circuitry for generating high quality audible output to the system user. Such circuitry is constructed according to known principles of analog circuit design as applied to portable radio or telephone equipment and being known in the art is not described here.

Fixed user terminals would interface to other communication systems, therefore, requiring interface circuitry for connection to telephone systems, optical cable systems, or other equipment.

The digital data is transferred out of the user terminal on the data line 154 which can be connected to a modem or other interface equipment for computers or other digital equipment. Circuits for interfacing computers or other equipment for processing digital data signals are known in the electronics arts and are not described here.

Outgoing voice or analog signals are received through the interface 152 and transferred to a voice-to-data encoder 156 which generates a digitized analog signal. This digitized signal is then transferred to a voice/data multiplexer 158. The multiplexer 158 multiplexes together digitized analog signals and digital data signals to form a digital communication signal. The term multiplexing is misleading in that most user terminals will handle either voice (analog) or data at one time and not both simultaneously, although this capability is built in to the system. The need for this capability also depends on the capabilities of the receiving users.

The output of the multiplexer 158 forms the input for a transmitter 166. The digital data is brought into the user terminal on a data bus line 160.

The voice-to-data or the data-to-voice encoders can be replaced with a single element referred to in the art as a voice coded 162.

The Demand Assignment Multiple Access (DAMA) module 164 acts in concert with central control facilities to determine the ability to access the system 10 by monitoring, air time, activity, account numbers, protocol, etc. A data bus, such as data bus 168 interconnects this module with the interfaced 162, and additional buses such as data buses 170, 172, 174 and 176 couple the DAMA module to the voice/data multiplexing and demultiplexing devices 148 and 158, and the receiver 146 and transmitter 166, respectively.

The communication system 10 allocates power to the particular user regardless of the actual activity level. This means that for long pauses or for very low data bit rates a larger percentage of the power is being wasted in sending and receiving "empty" signals. This energy also wastes capacity since the total power available in the system limits capacity and because of the nature in how each user forms interference for other users.

Therefore, within each user terminal 130 is one or more activity detectors or monitors for sensing the data or voice activity level of the terminal user. That is, the activity level of input signals are compared to a predetermined minimum threshold level used to define an "active" input signal condition. Input signals below this threshold represent no activity and above this threshold represent activity. The transmission power is, as described previously, adjusted in response to the change in activity. In this manner the relay sees no signal during the low or non-activity time, except for occasional bursts, and can accommodate additional users.

The user terminal 130 has been described in the same terms as the repeaters 12 or 14. The user terminals utilize spread spectrum receivers and transmitters to process communication signals into and from digital data signals The spread spectrum receivers and transmitters are the heart of the communication system 10 in that they provide the spreading and despreading function which in turn provides the processing gain and ability to use marginal isolation to achieve high quality, high capacity communications.

To achieve these results the spread spectrum receivers of the present invention use a particular demodulator circuit for despreading the incoming communication signals and generating a resulting digital signal. The demodulator circuit employed in the spread spectrum receiver 146 as shown in FIG. 10 is illustrated in further detail in FIG. 15.

Figure 15:
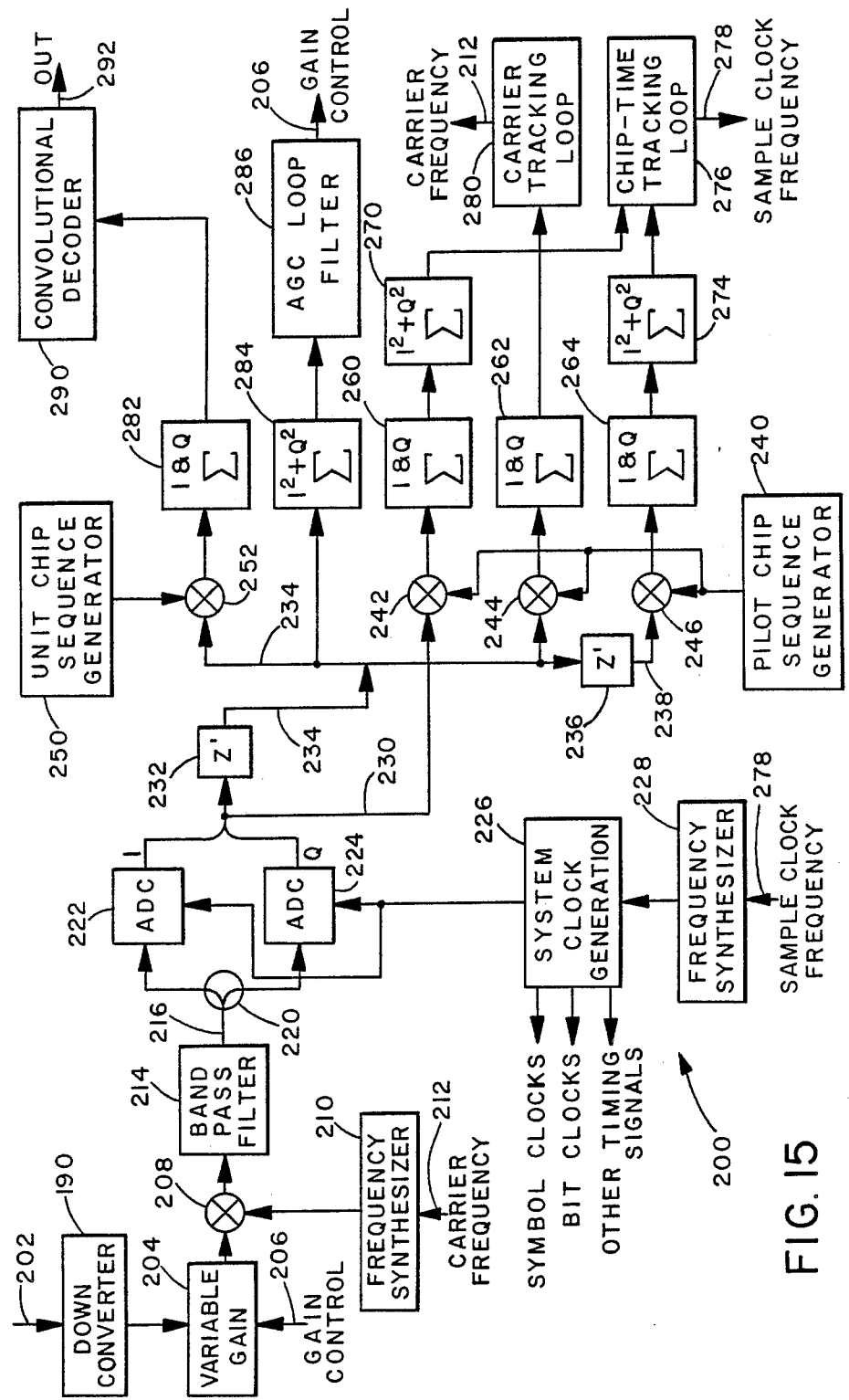
FIG. 15 is a schematic of a demodulator used in the user terminal of FIG. 10.

In FIG. 15 a demodulator 200 constructed according to the principles of the present invention is schematically illustrated. The demodulator 200 is proceeded by a downconverter 190 to change the frequency of the incoming communications signal to a lower intermediate frequency for processing using techniques or apparatus known in the art. An IF signal frequency such as, but not limited to, about 70 MHz is generally employed for communication signals in the L Band although this frequency is determined by the demands of specific applications. An incoming, RF frequency signal, 202 from the repeater 12 or 14, is processed by the downconverter 190 to provide an input, IF frequency, signal which is fed into a gain control element 204.

The gain control 204 compensates for fading and other energy alterations in the received signal which lead to degradation in processing. The gain element 204 provides a variable gain control function over an input signal and can be an electronically controlled gain device, such as would be known to those skilled in the electronics arts. For purposes of automatically controlling the gain provided by the gain control 204, a gain control signal 206 is generated by subsequent portions to the demodulator 200 as discussed further below.

This gain control function allows the demodulator 200 to operate without limiters and present the full band width to the analog-to-digital converters as described below. This prevents a loss of information during processing before the conversion process. Also the gain control 204 can normalize the input signal to a predetermined level which allows the analog-to-digital conversion process to be more efficient under changing conditions and make maximum use of the bits in the analog-to-digital conversion process. This is especially useful for purposes of the present invention since the transmission signals employed are generally power limited and the receiver may be called upon to compensate for a low energy signal level when the system is handling a large number of users.

The output of the gain control 204 is connected to an RF mixer 208 in which the IF frequency input signal is mixed with a predetermined carrier frequency to yield a lower frequency analog communications signal. The demodulation frequency is provided by a frequency synthesizer 210 which can be electronically controlled as in the case of a VCO, by a carrier input adjust signal 212. Therefore, for purposes of providing a lower frequency input signal, the synthesizer 210 provides the required mixer frequency. However, as the carrier is tracked by the communication system 10 and adjustments in the carrier frequency are effected by fading, Doppler shifting, etc, the demodulator can alter the synthesizer 210 output to also compensate. This is accomplished by changing the value of the carrier input frequency adjust signal 212. As will be shown below, other portions of the demodulator automatically provide this function.

The output of the RF mixer 208, which is an analog communications signal is passed through a band pass filter 214 to remove unwanted mixer products and out of band frequency components that may be present from the downconversion process. The resulting signal 216 is an intermediate frequency analog signal which represents a narrow band information signal spread over the allocated spectral bandwidth.

While still at baseband, the signal 216 is then divided into an in-phase (I) component and a quadrature (Q) component by the phase shift divider 220. The divider 220 can further comprise a divider and phase-shifter combination as would be apparent to those skilled in the art. The I and Q signals are also referred to in the art as the 0 degree and the 90 degree components, respectively.

The I and Q signals are then transferred to separate Analog-to-Digital (A/D) converters 222 and 224, respectively. That is, the I or 0 degree component from the divider 220 provides an input to the first A/D converter device 222 and the Q component, which is 90 degrees out of phase with the I component, provides an input for the A/D converter device 224. This configuration is used to provide more efficient conversion of the analog signal into digital form as well as improved accuracy for the later signal processing stages by breaking the Analog-to-Digital conversion process into two components.

In the preferred embodiment of the present invention each A/D device 222 and 224 would comprise a 4-bit converter. That is, each would convert a given portion of the analog signal 216 into a digital signal having 4-bit precision. Since the I and Q components are each converted into 4 bits of digital information and they are temporally in series, the communication link accommodates 8 bits of effective information per conversion time. The analog-to-digital conversion is divided into 4 bit increments to provide more efficient conversion since high speed 4-bit A/D converters are well developed in the art. However, the present invention does not require 4 bit increments to operate and other A/D converters may be employed where desired.

The A/D conversion process is clocked at a predetermined rate by a system clock 226 which also provides the appropriate timing signals used in the demodulator 200 as would be apparent to those skilled in the art who require a common in-phase clock source for other functions. The clock source 226 comprises any of a number of known frequency sources or synthesizers similar to frequency synthesizer 210. The system clock must be provided with a frequency driver so that the clocking rate is twice the "chip" frequency. The frequency source is adjustable, as in the case of a VCO, so that variations in the signal link can be accommodated and the signal locked onto. For this reason a frequency adjustment input signal is provided from a source 228 discussed below.

The output of the two A/D devices 222 and 224 are connected to a common output data bus 230 which transfers the 0 degree and the 90 degree related four data bits in serial fashion to other parts of the demodulator 200 circuitry. The digital communications signal on data bus 230 is input to a first four-phase rotator 242 where it is combined with a pilot chip sequence which is provided from a pilot chip sequence generator 240. The resultant signal is transferred in to a first summation means 260 where the I and Q components are summed over a length of time when they are coherent.

Inserted into the transmitted signal is a phase coherent and chip synchronous, chip sequence that is defined as a pilot chip sequence. This pre-defined and generated chip sequence is a new method of providing phase and time acquisition and tracking, and multi-path correction.

In previous systems a code in the form of a tone might be used. The tone was encoded along with input data and transmitted to the receiver. Each user required a different tone. At the receiver the decoding process would reproduce the tone which could be detected using a series of filters or other elements. Any variations in the desired tone, phase or frequency, were then adjusted for accordingly. In principle this technique provides a reference signal for tuning the frequency tracking and decoding stages of a demodulator. However, the encoding and decoding of the signal and then subsequent active detection was slow, and reasonably inaccurate. Any errors in the detection or decoding of a chip sequence and/or propagation errors also create errors in a decoded tone decreasing the ability to correctly compensate or adjust the carrier and chip synchronization tracking with this technique.

The receiver of FIG. 15 preferably uses a time tracking error detector known in the art as a "delay-lock" detector. This detector functions by subtracting the power in an early correlation of the received signal with the local reference pilot sequence from the power in a late correlation of the received signal with the local reference pilot sequence. If there is no time tracking error, this difference signal will be zero. If the time error is such that the local reference signal leads the correct timing, then a negative difference signal will be produced. Conversely, if the local reference lags the correct timing, then a positive difference error signal will be produced. The error signal is used to correct the timing in chip-time tracking loop 276.

The early correlation is produced in correlator 242 by correlating I and Q signals on bus 230 with the pilot chip sequence. The result is integrated in integrator 260 and the power determined by circuit 270. The late correlation is produced in correlator 246 by correlating the twice delayed signals on bus 238 with the pilot chip sequence generator 240 output. This signal is integrated by integrator 264 and power determined by circuit 274. The outputs of circuits 270 and 274 are differenced in the chip-time tracking loop 276.

The delay elements 232 and 236 determine the amount of time difference between the early and late correlations. Preferably, these delays are set to a value equal to $\frac{1}{2}$ chip duration, although other values may be preferred in certain applications.

The carrier tracking loop operates on the output of on-time correlator 244, which correlates the output of delay element 232 with the pilot chip sequence generator 240. The correlator output is integrated in integrator 262 to provide an input to carrier tracking loop 280.

An alternate embodiment would provide early, late and on-time correlations of the received signal with the pilot sequence by delaying the pilot chip sequence generator 240 output in two $\frac{1}{2}$ chip time delay elements and then correlating with the signals on bus 230.

The correlator means 252, 242, 244 and 246 are comprised of four-phase rotator elements which serve to rotate the phase of the input signal by 0, 90, 180 or 270 degrees as determined by the pilot chip sequence input bits. Circuits for accomplishing this function are readily apparent to those skilled in the communications art.

Integrator means 260, 262, and 264 integrate the outputs of their respective correlators by summing samples over an interval equal to the length of the short pilot chip sequence. Integrator 282 integrates the output of the unit chip sequence correlator 252 over an interval equal to the data symbol time. The I and Q signals output from each correlator are summed in separate integrators.

The power in a signal is determined by the circuits 284, 270 and 274. The I and Q outputs of the integrators are each squared and then summed to provide a measure of the power in the signals. Integrator 284 measures the broadband noise power on bus 234 for use in setting the receiver gain, while integrators 274 and 270 measure the power in the early and late correlations of the pilot chip sequence.

The signal 278 is coupled to the frequency synthesizer 228 a previously described and serves to alter the frequency generated in the synthesizer 228. This can be accomplished in several ways understood in the art such as establishing a predetermined voltage level in the signal 278 at the input of the synthesizer 228 which operates as a VCO. If the communication signal is late, then the tracking loop 276 establishes a lower voltage level for the signal 278 which decreases the frequency output by the synthesizer 228. On the other hand, if the communication signal is early then the voltage level of the signal 278 increases and the output frequency of the synthesizer 228 increases.

The alteration of the output frequency for the synthesizer 228 increases or decreases the timing provided by the system clock generation element 226, which in turn alters the rate at which the A/D converters 222 and 224 convert the analog data into the digital signal chip patterns.

Therefore, as the system receives an incoming communication signal and also receives a pilot chip sequence, the portion of the circuit just described allows the detection of the relative timing of the user terminal with respect to the pilot chip sequence transmission and adjustment of the Analog-to-Digital rates to account for the variations in this timing. In addition, this circuitry is used to lock onto the correct carrier frequency.

By connecting the output of the coherent summing means 262, for the "on-time", once-delayed, signal, to a carrier tracking loop 280 the carrier frequency is acquired and tracked. As the value of the summation for the on-time signal decreases it is assumed the local carrier frequency needs to be decreased. As the summation for the on-time signal increases the local carrier frequency is increased. To implement these changes, the output of the tracking loop is provided as a signal 212 which is input to the frequency synthesizer 210 as previously discussed. This changes the frequency used for the IF demodulation and causes the demodulator 200 to track the incoming carrier.

What has been described to this point is the initial operating function of the demodulator wherein the incoming communication signals are converted to a digital form and compared to the predetermined pilot chip sequence. This allows the determination of both the correct carrier frequency as well as the adjustment of the sample clock 278 to acquire the proper synchronization with the chip rate.

Once the tracking has been properly locked onto the incoming signal the actual decoding or demodulation of the data can occur to provide the user terminal with the information being transferred in the communication signals along the communication link.

The actual data or voice spread spectrum decoding is accomplished by sending the on-time signal provided by the delay element 232 on the data bus 234 to a convolutional decoder such as, but not limited to, a Viterbi algorithm decoder 290. However, the I and Q components are first summed using a summation means 282. The demodulators used in the hub 16 can also use a phase correction filter to assure that the information remains in-phase with the appropriate convolutional decoding process during the hub translation and signal processing steps.

The demodulator 200 must demodulate CDMA spread spectrum signals which means that a unique chip sequence which is used to encode or spread the input signal must be generated and used to despread the communication signal. Therefore, the incoming on-time signal provided by the A/D converters and through the delay element 232 onto bus 234 is mixed in a four-phase rotator 252 with a unit chip sequence to yield a signal only for that chip sequence corresponding to the correct user terminal.

The information is now decoded by the convolutional decoder 290 at the predetermined decoding rate to remove the interleaved error detection bits, and transferred to appropriate vocoder and other analog circuitry such as preamplifiers, amplifiers, and speaker systems where the user can utilize it. At this point the signal 292 can be further processed to provide additional demodulation and conversion from a digital to an analog output as known in the art. The signal would be subject to conventional amplification and gain techniques as would be useful for the receiving station.

In order to provide automatic adjustment of the gain control 204, a square and summation means 284 also receives the in-phase and quadrature signals from the data bus 234 and processes them to provide a signal indicative of the relative energy or power level of the signals. Since the in-phase and quadrature signals can vary greatly and change signs during initial acquisition and tracking they are first squared and then summed together to prevent cancellation. The results of this operation are transferred to an automatic gain control loop filter 286 where a control signal 206 is generated which increases or decreases the gain provided by the variable gain control 204 depending upon the decrease or increase in relative signal strength for received communication signals.

The demodulator 200 represents the basic demodulator used in the preferred embodiment of the communication system 10. However, it will be apparent to those skilled in the art that demodulation of communication signals in a repeater or a hub will not employ the pilot tracking circuitry. Furthermore, repeater and hub circuits employ narrower band filters and timing loops.

The demodulator of FIG. 15 provides a narrow band information signal from a received spread-spectrum communication signal. For the return transmission in a communication link a modulator is required in the transmitter of the user terminals 20, 22, 24, 26, repeaters 12, 14, or hubs 16.

In the transmitter 166 of the user terminal 130 illustrated in FIG. 10 is a modulator 300 for generating spread spectrum CDMA communication signals for transmission. A modulator circuit and method is provided which encodes and modulates input information which can be data or voice as previously described.

Figure 16:
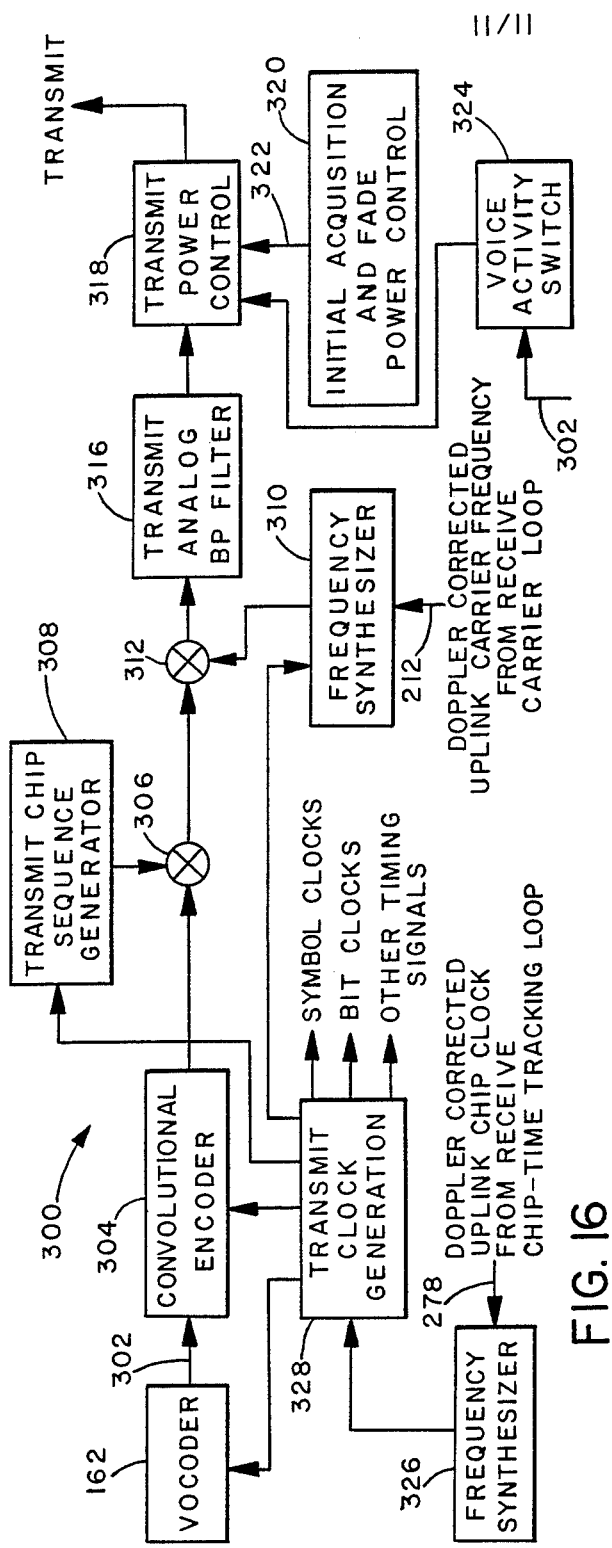
FIG. 16 is a schematic of a modulator used in the user terminal of the FIG. 10.
Figure 13:
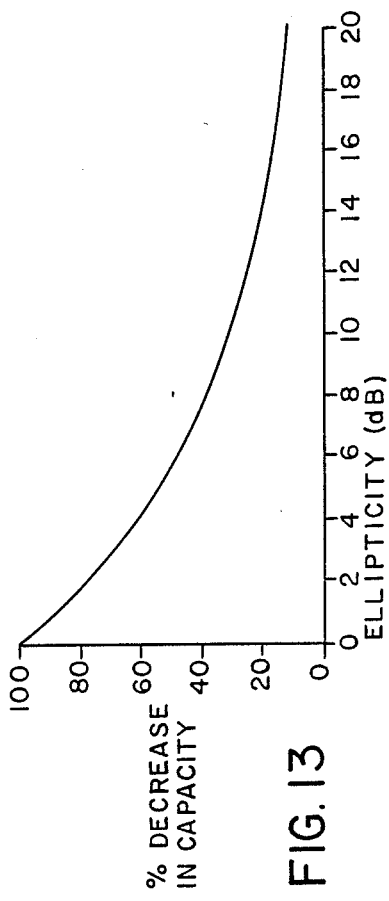
FIG. 13 is a graphic presentation of capacity versus antenna ellipticity.

A modulator circuit constructed according to the principles of the present invention is illustrated in FIG. 16. In FIG. 16 the modulator 300 receives incoming information signals 302 and inputs them into a convolutional encoder 304. The information signals 302 are processed by a voice to digital encoder, here illustrated as voice coded 162, or multiplexed in as digital data. The signals 302 are previously amplified, filtered, or processed signals originating at the user terminal and processed according to typical analog processing for communications prior to transmission.

The present invention contemplates using the latest in voice coding techniques to improve the quality of communication and allow for decreased bandwidth where possible. This translates to decreased overall power when the signal is spread, which improves system 10 capacity.

For this reason current coding schemes planned for use in the embodiments of the present invention include Linear Predictive Coding (LPC) and Continuously Variable Sloped Delta (CVSD) modulation. These techniques can accommodate data rates on the order of 4.8 to 16.0 kbps (kilo-bits per second) which is very advantageous. Current integrated circuits exist for providing these high speed coding functions in a small package or space as would be required for mobile user terminals. This handles the demand for high speed digital data encoding as well. The high spread spectrum chip frequency also handles multiples of common data rates such as 56, 32, 16, 9.6, 4.8, 2.4 kbps and down to 75 bps, thus, addressing the most desired data rates.

At a future time the communication system 10 can be changed to use other types or even slower rate encoders/decoders if desired without altering the entire communication system.

After digital encoding the information signal is transferred to a convolutional encoder 304. A convolutional encoder is understood by those skilled in the art to provide interleaving of the actual data bits forming the input signal and additional bits for ascertaining, or monitoring errors and providing for correction. The present invention allows for a variety of coding rates from $\frac{1}{4}$ to $\frac{1}{2}$ or more since the present invention is not constrained by the data rates.

The output of the convolutional encoder 304 is a digitally encoded information signal which is mixed with a spreading chip sequence in a four-phase rotator mixer 306.

The chip sequence is provided by a chip sequence generator 308 which generates or stores the chip sequence assigned to the user terminal 130. The assignment of user terminal chip sequences has been previously described above and is not repeated here. However, the transmitted communication signal also requires identification of the recipient in addition to the source terminal. This can be accomplished by using communication protocols known in the art.

In most communication systems the transmitting user sends a digital code representative of a recipient's telephone, radio phone, user terminal, or other unique identification number as part of an initiating communication signal. This number can be encoded in a specific pattern of data bits with accompanying control codes which indicate that a communication signal contains a receiver address and an initial communication link request. Since several protocol and link initiation code schemes which are compatible with the present invention are well understood in the art, additional circuitry used to implement them is not shown in FIG. 16.

The broad band spread information signal produced by the mixer 306 operation is transferred to an RF mixer 312 where it is mixed with a carrier frequency to produce the communication signals to be transmitted. The carrier frequency is provided by or generated in a frequency synthesizer 310. The specific frequency used is predetermined by the spectral allocation for the communication system 10 as well as any special spectral allocations for particular users. However, the frequency source 310 is adjustable so that the effects of Doppler shifting can be compensated for on the uplink side of a communication link.

This is accomplished by observing apparent changes in the carrier frequency detected by the demodulator 200 in the receiver 146. As previously described, a carrier tracking signal 212 is generated in the demodulator 200 which is indicative of variations in the received carrier tracking frequency in relation to a local carrier frequency. This same signal can be coupled to the frequency synthesizer 310 to adjust the carrier frequency used for transmission. As the carrier is observed by the receiver to vary due to a variety of effects, the transmitter automatically adjusts the return link to also compensate. In this manner, a repeater does not perceive a change, or very little change, in carrier tracking due to Doppler and other effects. Therefore, user terminals, even though mobile, appear substantially stationary to communication system 10 repeaters and do not require compensation in the repeater.

The communication signal provided by the mixer 312 is coupled into a transmit analog bandpass filter 316 which acts to filter out undesirable frequencies which are outside of the range of the target system and represent a loss of useful transmission power.

The output of the bandpass filter 316 is coupled to a transmit power control device 318 which provides the final amplification and control of transmission power for the communication signal presented to an antenna. The power control device 318 is adjustable both in terms of overall power level and duty cycle or duration.

The relative strength of received communication signals can be determined in the demodulator 200 such as in the automatic gain control loop filter 286. From this a control signal can be provided to a fade and power adjust control circuit 320. The control circuit 320 detects the increase or decrease in signal strength according to a signal 206 and provides an appropriate control signal 322 to the transmit power control device 318 to either increase or decrease output power This allows the user terminal to compensate for changes in relative position with respect to a repeater as well as some degree of fading without requiring additional power compensation schemes in the repeater circuitry. Therefore, the repeater observes the signal strength of the user terminal as if the terminal is in a fixed location. Alternatively, a repeater can of course, use a fixed control signal to indicate fading of received signals and send information to the control device 318 as part of the pilot sequence or communication protocol to instruct it to compensate subsequent communications.

As previously discussed the user terminals 20, 22, 24, and 26 employ a speech, voice, analog signal, or digital signal activity detector to decrease the amount of unnecessary power consumed and interference generated. To accomplish this an activity detector 324 is provided, here labeled as a voice activated switch (VOX), which is coupled to the input signal 302 or the output of the convolutional encoder 304. For purposes of illustration a voice signal is described but a digital input signal can also be accommodated by the modulator 300 and the VOX 324.

The VOX 324 detects the general activity level of the input information signal and determines when the output transmission can be turned off due to a lack of activity. The amount of power required or available in a communication system, as well as the amount of capacity increase desired, determine the length of periods of "non-activity" that are chosen. The VOX 324 provides a control signal to the power control device 318 which instructs it to alter the duty cycle for transmission signals. In this manner only short periodic bursts are sent by the transmitter when there is no activity. This allows the communication system 10 to continue maintaining and tracking the communication link for the user terminal 130 while not wasting power and, therefore, communication system 10 capacity.

The output leaving the power control device 318 is transferred to the appropriate antenna structure employed by the user terminal 130. The modulator 300 has been described in terms of generating a communication signal at the desired carrier frequency. Alternatively, the frequency synthesizer 310 provides an intermediate frequency from the mixer 312. In this case an upconvertor stage is disposed between the power control device 318 and any antenna to upconvert the output communication signals to the appropriate carrier frequency for the communication system 10.

In addition to the power control, the frequency synthesis and the timing used for the bit and symbol clocks are adjustable to compensate for the Doppler shift and fading effects found primarily in mobile systems. That is, the demodulator 200 tracking loops are used to provide signals to the modulator 300 to alter the frequency generated by a frequency synthesizer 326 which in turn drives the modulator 300 clock generation device 328.

What has been described then is a new communication system employing CDMA spread spectrum processing techniques. The user terminals and repeaters for the communication system use a new modulator and demodulator design to transmit and receive communication signals. The user terminals and repeaters use means for creating marginal isolation between user communication signals such as, but not limited to, multiple beam phased array repeater antennas, polarization enhanced omni-directional antennas, voice or activity switching, or adjustable user terminal power control to increase the capacity of the system.

The repeaters for the communication links are orbital or terrestrially based repeater stations that can provide a variety of communication paths to compensate for Doppler shifts, and multi-path problems found in other communication systems. The orbital and terrestrial repeaters can interconnect to offload users from each other and cover selected geographical regions or user classes where desired. The use of multiple beam antennas further increases system capacity and provides an ability to uniquely control communication links within the system.

It will be appreciated by those skilled in the art that additional means or methods of providing marginal isolation between users can be used without varying from the scope of the invention. Also alternate methods of providing spread spectrum waveforms other than those specifically discussed herein are contemplated by the present invention.

The preferred embodiment has been described utilizing one or more repeaters for ease of illustration that demonstrates the advantages as an initial system. However, a communication network employing direct user-to-user links with marginal isolation is also contemplated by the present invention.

The foregoing description of preferred embodiments has been presented for purposes of illustration and description. It is not intended to be exhaustive nor to limit the invention to the precise form disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What we claim is:

1. A multiple access, spread spectrum communication system, comprising:
   means for communicating information signals between at least two of a plurality of system users using code-division-spread-spectrum communication signals;
   isolation means, coupled to said means for communicating, for unequally weighting signal power of said code-division-spread-spectrum communication signals, wherein said isolation means comprises:
   activity detection means for measuring signal activity levels for said information signals relative to a no activity level over a predetermined sampling time and for providing an activity signal corresponding to measured activity; and
   power control means coupled to said means for communicating for adjusting a transmission power duty cycle for said code-division-spread-spectrum communication signals in response to changes in said activity signal.

2. A multiple access, spread spectrum communication system, comprising:
   means for communicating information signals between at least two of a plurality of system users using code-division-spread-spectrum communication signals;
   isolation means, coupled to said means for communication, for unequally weighting signal power of said code-division-spread-spectrum communication signals; and
   wherein said means for communicating further comprises:
   chip generation means for generating a plurality of quasi-orthogonal spreading functions;
   code selection means for assigning one of said spreading functions to a user;
   a plurality of mobile user terminals capable of transmitting and receiving said code-division-spread-spectrum communication signals, each of said user terminals comprising:
   transmission means for generating a code-division-spread-spectrum communication signal in response to an input information signal according to an assigned spreading function;
   receiver means for generating an output information signal by processing a received code-division-spread-spectrum communication signal according to said assigned spreading function; and
   at least one omni-directional antenna coupled to said transmission means and said receiver means; and
   at least one repeater means for receiving code-division-spread-spectrum communication signals from said plurality of user terminals and for translating said code-division-spread-spectrum communication signals to form suitable for transfer to an intended recipient user.

3. The communication system of claim 2 wherein said repeater means further comprises means for transmitting a predetermined pilot chip sequence to said users.

4. The communication system of claim 2, wherein said at least one repeater means further comprises a phased array antenna structure capable of generating simultaneous multiple steerable beams.

5. The communication system of claim 2, wherein said at least one repeater means comprises at least one terrestrially based repeater means centrally located within a geographical region.

6. The communication system of claim 2, wherein said at least one repeater means comprises at least one satellite based repeater means.

7. The communication system of claim 2 further comprising at least one transceiver hub for receiving communication signals from said repeater means and transmitting communication signals to said repeater means.

8. The communication system of claim 2, wherein said at least one repeater means comprises:
   at least one terrestrially based repeater for receiving, translating and re-transmitting said code-division-spread-spectrum communication signals;
   at least one satellite based repeater for receiving, translating, and retransmitting said code-division-spread-spectrum communication signals; and
   said user terminals are configured to transmit and receive code-division-spread-spectrum communication signals through at least one repeater means and each repeater means configured to receive and transmit code-division-spread-spectrum communication signals between to said user terminals.

9. The communication system of claim 8 further comprising polarization control means coupled to said omni-directional antenna for adjusting said antenna so as to select a predetermined polarization mode from a plurality of modes.

10. The communication system of claim 2 wherein said receiver further comprises a demodulator, comprising:
    input means for sampling substantially the entire bandwidth of said code-division-spread-spectrum signals;
    phase division means connected in series with said input means for dividing said spread spectrum signal into an analog in-phase signal and an analog quadrature signal;
    converter means connected to said phase division means for converting said analog in-phase and analog quadrature signals to digital in-phase and quadrature signals at a variable rate.

11. A multiple access, spread spectrum communication system, comprising:
    means for communicating information signals between at least two system users using code-division-spread-spectrum communication signals, said means for communicating comprising:
    chip generation means for generating a plurality of quasi-orthogonal spreading functions;
    code selection means for assigning at least one of said spreading functions to a system user;
    a plurality of mobile user terminals capable of transmitting and receiving said code-division-spread-spectrum communication signals, each of said user terminals comprising:
    transmission means for generating a code-division-spread-spectrum communication in response to an input information signal according to said assigned spreading function; and
    receiver means for generating an output information signal by processing a code-division-spread-spectrum communication signal according to said assigned spreading function; said receiver having a demodular, comprising:

input means for receiving code-division-spread-spectrum communication signals;

a variable frequency source generating a local reference signal of predetermined frequency;

a radio frequency mixer connected to said input means and said variable frequency source for the code-division-spread-spectrum communication signals with the local reference signal to provide an intermediate spread spectrum signal;

filter means connected in series with said radio frequency mixer for filtering undesirable frequency components from said intermediate spread spectrum signal;

phase division means connected in series with said filter means for dividing said spread spectrum signal into an analog in-phase signal and an analog quadrature signal;

converter means connected to said phase division means for converting said analog incident and quadrature signals to digital incident and quadrature signals at a variable rate;

combiner means connected to an output of said converter means for juxtaposing said digital in-phase and quadrature signals onto a single data line for transfer to other components within said demodulator in serial fashion;

pilot chip reference means for generating a local bit sequence corresponding to a predetermined pilot chip sequence transmitted contiguous with communication signals received by said demodulator, said local bit sequence being generated with a predetermined period;

carrier tracking means connected to said combiner means and said pilot reference means for comparing said local pilot chip sequence to received signals in a timed relationship to determine the timing of said code-division-spread-spectrum communication signals with respect to said local pilot chip sequence and for adjusting the frequency of said variable frequency source;

chip synchronization means connected to said combiner means and said pilot reference means for comparing said local pilot chip sequency to received signals in a plurality of timed relationships to determine the timing of said code-division-spread-spectrum communication signals with respect to said local pilot chip sequence and for adjusting the rate for said converter means;

unit chip means for generating a bit sequence corresponding to said assigned spreading function;

despreading means connected to said combiner and said unit chip means for generating despread-spectrum in-phase and quadrature information signals;

output means connected to said despreading means for combining said despread-spectrum quadrature and in-phase signals into an output information signal;

at least one omni-directional antenna; and at least one repeater means for receiving code-division-spread-spectrum communication signals from said plurality of user terminals and translating said code-division-spread-spectrum communication signals to a form for transfer to an intended recipient user.

12. The demodulator of claim 11 wherein said carrier tracking means and said chip-time tracking means further comprise:

first correlation means connected to said combiner means and said pilot reference means for comparing said in-phase and quadrature signals with said pilot chip sequence and providing an output representative of a first correlation pattern;

second correlation means connected to said combiner means and said pilot reference means for delaying said in-phase and quadrature signals an amount of time on the order of said pilot chip period and comparing said signals with said pilot chip sequence and providing an output representative of a second correlation pattern;

third correlation means connected to said combiner means and said pilot reference means for delaying said in-phase and quadrature signals an amount of time on the order of half said pilot chip period and comparing said signals with said pilot chip sequence and providing an output representative of a third correlation pattern;

chip synchronization means connected to said first and third correlation means for adjusting the rate of said converter means in response to the output provided by said first correlation and third correlation means; and a carrier tracking loop connected to said second correlation means for adjusting said variable frequency source in response to the output provided by said second correlation means.

13. The demodulator of claim 11 further comprising a variable gain control disposed between and connected in series with said input means and said radio frequency mixer; and automatic gain control means connected to said combiner means for altering the gain said variable gain control in response to an absolute magnitude of said in-phase and quadrature signals.

14. The demodulator of claim 11 wherein said converter means comprises first analog conversion means for converting said in-phase signal to a digital in-phase signal and second analog conversion means for converting said quadrature signal to a digital quadrature signal.

15. The demodulator of claim 11 wherein said first correlation means comprises:

first means for multi-phase mixing said digital in-phase and quadrature signals with said pilot chip sequence;

first coherent summation means coupled to said means for multi-phase mixing, for generating the sum of said in-phase and said quadrature signals coherently over a predetermined period of time; and squared summation means for generating the sum of the square of said in-phase and said quadrature signals over a predetermined period of time.

16. The demodulator of claim 11 wherein said second correlation means comprises:

second means for multi-phase mixing said incidence and quadrature signals with said pilot chip sequence;

first delay means positioned between said combiner means and said second means for multi-phase mixing; and second coherent summation means coupled to said second means for multi-phase mixing, for generating the sum of said in-phase and said quadrature signals coherently over a predetermined period of time.

17. The demodulator of claim 11 wherein said third correlation means comprises:
   third means for multi-phase mixing said incidence and quadrature signals with said pilot chip sequence;
   second delay means positioned between said first delay means and said third means for multi-phase mixing;
   third coherent summation means coupled to said third means for multi-phase mixing, for generating the sum of said in-phase and said quadrature signals coherently over a predetermined period of time; and
   second squared summation means for generating the sum of the square of said in-phase and said quadrature signals over a predetermined period of time.

18. A multiple access spread spectrum communication system, comprising:
   means for communicating information signals between at least two system users using code-division-spread-spectrum communication signals, said means for communicating comprising:
      chip generation means for generating a plurality of quasi-orthogonal spreading functions;
      code selection means for assigning at least one of said spreading function to a system user;
      a plurality of mobile user terminals capable of transmitting and receiving said code-division-spread-spectrum communication signals, each of said user terminals comprising:
         transmission means for generating a code-division-spread-spectrum communication in response to an input information signal according to said assigned spreading function;
         activity detection means couple to said transmission means for sensing signal activity levels in said input information signal and decreasing a user terminal transmission power duty cycle in response to a decrease in sensed activity below a predetermined threshold level for a predetermined sampling period; and
         receiver means for generating an output information signal by processing a code-division-spread-spectrum communication signal according to said assigned spreading function;
      at least one omni-directional antenna; and
      at least one repeater means for receiving code-division-spread-spectrum communication signals from said plurality of user terminals and translating said code-division-spread-spectrum communication signals to a form for transfer to an intended recipient user.

19. A multiple access, spread spectrum communication system, comprising:
   means for communicating information signals between at least two system user's using code-division-spread-spectrum communication signals, said means for communicating comprising:
      chip generation means for generating a plurality of quasi-orthogonal spreading functions;
      code selection means for assigning at least one of said spreading functions to a system user;
      a plurality of mobile user terminals capable of transmitting and receiving said code-division-spread-spectrum communication signals, each of said user terminals comprising:
         transmission means for generating a code-division-spread-spectrum communication in response to an input information signal according to said assigned spreading function;
         receiver means for generating an output information signal by processing a code-division-spread-spectrum communication signal according to said assigned spreading function;
      at least one omni-directional antenna;
      at least one repeater means for receiving code-division-spread-spectrum communication signals from said plurality of user terminals and translating said code-division-spread-spectrum communication signals to a form for transfer to an intended recipient user; and
      activity detection means coupled to said repeater means for sensing signal activity levels in said code-division-spread-spectrum communication signals and decreasing repeater transmission power duty cycle in response to a decrease in sensed activity below a predetermined threshold level for a predetermined sampling period.

20. A multiple access, spread spectrum communication system, comprising:
   means for communicating information signals between at least two system users, using code-division-spread-spectrum communication signals, said means for communicating comprising:
      chip generation means for generating a plurality of quasi-orthogonal spreading functions;
      code selection means for assigning at least one of said spreading functions to a system user;
      a plurality of mobile user terminals capable of transmitting and receiving said code-division-spread-spectrum communication signals, each of said user terminals comprising:
         transmission means for generating a code-division-spread-spectrum communication in response to an input information signal according to said assigned spreading function;
         receiver means for generating an output information signal by processing a code-division-spread-spectrum communication signal according to said assigned spreading function; and
         link power control means connected to said receiver means for sensing a received power level present in a received first code-division-spread-spectrum communication signals and for adjusting power applied to an antenna for transmitting a second code-division-spread-spectrum communication signals in response to the sensed power level;
      at least one omni-directional antenna; and
      at least one repeater means for receiving code-division-spread-spectrum communication signals from said plurality of user terminals and translating said code-division-spread-spectrum communication signals to a form for transfer to an intended recipient user.

21. A spread spectrum multiple access communication system having high system user capacity, comprising:
   means for communicating system user addressable information signals between at least two of a plurality of system users using address corresponding code-division-spread-spectrum communication signals, said means for communicating generating mutual interference in communications between said at least two system users by contemporaneously communicating code-division-spread-spectrum communication signals between other system users, and said means for communicating having a processing gain for reducing said mutual interference; and isolation means, coupled to said means for communicating, for providing an increase in system user realized average signal power for said system user address corresponding code-division-spread-spectrum communication signals in communications between said at least two system users relative to mutual interference signal power of said contemporaneous communications between said other system users.

22. The communication system of claim 21 wherein said isolation means comprises an antenna system having an antenna beam pattern forming multiple directive beams.

23. The communication system of claim 21 wherein said isolation means comprises an antenna system configured to obtain polarization mode selection between a plurality of polarization modes.

24. The communication system of claim 21 wherein said isolation means comprises:

activity detection means for measuring signal activity levels for said information signals relative to a no activity level over a predetermined sampling time and for providing an activity signal corresponding to measured activity; and power control means coupled to said means for communicating for adjusting a transmission power duty cycle for said code-division-spread-spectrum communication signals in response to changes in said activity signal.

25. The communication system of claim 21 wherein said isolation means comprises interference pattern means for generating interference patterns of maximum signal to noise ratio at a receive location in communicated code-division-spread-spectrum communication signals, said interference pattern means having transmission means for transmitting a same communication signal via at least two different communication paths to said receive location and control means coupled to said transmission means for adjusting at least one of signal phase and transmission start times in said transmissions of said same communication signal transmitted via said different communication paths.

26. The communication system of claim 21 wherein said means for communicating further communicates a same communication signal via at least two different communication paths and said isolation means comprises signal combination means for coherently combining said same communication signal as received at a receive location from said different communication paths, said signal combination means having reception means for receiving each of said same communication signals as transmitted via each of said different communication paths and control means coupled to said reception means for adjusting at least one of signal phase and timing in receptions of said same communication signal via said different communication paths.

27. The communication system of claim 21 wherein said means for communicating comprises:

a plurality of terrestrially based repeater means for transmitting said code-division-spread spectrum communication signals;

a plurality of transceiver means each coupled to a respective one of certain system users for receiving said code-division-spread-spectrum communication signals and for transmitting system user addressed code-division-spread-spectrum communication signals;

said plurality of repeater means further for receiving transceiver means transmitted code-division-spread-spectrum communication signals; and wherein said isolation means comprises the placement of each repeater means at a predetermined position with respect to each other repeater means, each repeater means in communicating with at least one of said certain system users within a predetermined respective geographic region using said code-division-spread-spectrum communication signals with mutual interference signal power from communications in adjacent geographic regions attenuated as a function of distance therefrom.

28. The communication system of claim 21 wherein said means for communicating further comprises:

link control means for detecting a minimum power level required to maintain code-division-spread-spectrum communication signals in a user communication link above a predetermined incident power level and for providing a link control signal corresponding to said minimum power level;

power control means connected to said communication means and said link control means for adjusting a transmission power level for said code-division-spread-spectrum communication signals in response to said link control signal.

29. The communication system of claim 21 wherein said means for communicating further comprises:

chip generation means for generating a plurality of quasi-orthogonal spreading functions;

code selection means for assigning one of said spreading functions to a user;

a plurality of mobile user terminals capable of transmitting and receiving said code-division-spread-spectrum communication signals, each of said user terminals comprising:

transmission means for generating, according to an assigned spreading function, a code-division-spread-spectrum communication signal in response to an input information signal;

receiver means for generating an output information signal by processing a received code-division-spread-spectrum communication signal according to said assigned spreading function; and at least one omni-directional antenna for coupling to said transmission means and said receiver means; and at least one repeater means for receiving code-division-spread-spectrum communication signals from said plurality of user terminals and for translating said received code-division-spread-spectrum communication signals to a form suitable for transfer to an intended recipient user.

30. The communication system of claim 21 wherein said code-division-spread-spectrum signals are transferred over one or more communication channels and said isolation means provides isolation between system user addressed signals in communications between said at least two system users and mutual interference signals in communications between said other system users in the range of about 1 dB to 15 dB.

31. The communication system of claim 21 wherein said means for communicating is configured for transmitting information signals from at least one central communication stations to at least one remote system users.

32. The communication system of claim 21 wherein said means for communicating is configured for transmitting information signals from at least one remote system users to at least one central communication stations.

33. In a spread spectrum multiple access communication system in which system users communicate user addressable information signals using address corresponding code-division-spread-spectrum communication signals wherein with respect to communications between at least two system users other system users generate mutual interference by contemporaneously communicating code-division-spread-spectrum communication signals with said system having a processing gain for reducing mutual interference, in said communication system a method for providing high system user capacity by further reducing mutual interference in communications between said at least two system users comprising the steps of:

providing a plurality of system user addressable narrow band information signals;

converting said plurality of system user addressable narrow band information signals into a corresponding plurality of system user address corresponding wide band code-division-spread-spectrum communication signals;

transmitting said plurality of code-division-spread-spectrum communication signals between system users;

receiving, at each respective system user, system user address corresponding code-division-spread-spectrum communication signals and other respective system user addressed code-division-spread-spectrum communication signals as mutual interference;

providing for each respective system user an increase in system user realized average signal power for said system user address corresponding code-division-spread-spectrum communication signals with respect to mutual interference signal power of said other system user address corresponding code-division-spread-spectrum communication signals; and converting, at each respective system user, received address corresponding code-division-spread-spectrum communication signals into corresponding user addressable information signals.

34. The method of claim 33 wherein said step of providing an increase in system user realized average signal power comprises the steps of:

providing an antenna system having an antenna beam pattern forming multiple directive beams with each beam corresponding to certain system users; and radiating each system user address corresponding code-division-spread-spectrum communication signals on each of said beams corresponding to each system user to which said radiated system user address corresponding communication signal corresponds.

35. The method of claim 33 wherein said step of providing an increase in system user realized average signal power comprises the steps of:

providing an antenna system having an antenna beam pattern forming multiple directive beams with each beam corresponding to certain system users; and collecting upon each beam code-division-spread-spectrum communication signals from said corresponding system users which correspond to each respective beam.

36. The method of claim 33 wherein said step of providing an increase in system user realized average signal power comprises the step of providing each system user with a polarization mode selectable antenna set to receive transmitted code-division-spread-spectrum communication signals according to a predetermined one of a plurality of polarization modes where address corresponding code-division-spread-spectrum communication signals are transmitted according to a polarization mode to which said antenna system of each address corresponding system user is set to receive.

37. The method of claim 33 wherein said step of providing an increase in system user realized average signal power comprises the steps of:

measuring signal activity levels for said information signals relative to a no activity level over a predetermined sampling time;

providing an activity signal corresponding to said measured activity levels; and adjusting a transmission power duty cycle for said code-division-spread-spectrum communication signals in response to changes in said activity signal.

38. The method of claim 33 wherein said step of providing an increase in system user realized average signal power comprises the steps of:

transmitting, in said step of transmitting, a same system user address corresponding code-division-spread-spectrum communication signal via at least two different communication paths to an address corresponding system user located at a receive location; and adjusting in said transmission of said same communication signal one of signal phase and signal transmission delay time as transmitted upon said different communication paths, wherein an interference pattern occurs having a maximum signal to noise ratio in said transmitted same communication signals at said receive location.

39. The method of claim 33 wherein said step of providing an increase in system user realized average signal power comprises the steps of:

receiving at a system user located at a receive location a same system user address corresponding code-division-spread-spectrum communication signal as transmitted upon at least two different communication paths in said step of transmitting; and coherently combining said same communication signal as received upon said different communication paths by adjusting at least one of signal phase and signal reception delay time of said same communication signal as received upon said different communication paths.

40. The method of claim 33 wherein said step of transmitting comprises the steps of:

providing a plurality of terrestrially based repeaters each capable of transmitting said code-division-spread-spectrum communication signals;

providing for certain system users a transceiver capable of transmitting and receiving said code-division-spread-spectrum communication signals; and wherein said step of providing an increase in system user realized average signal power comprises the step of placing each repeater at a predetermined position with respect to other repeater wherein each repeater communicates with at least one of said certain system users within a predetermined respective geographic region using said code-division-spread-spectrum communication signals with mutual interference signal power from communications in adjacent geographic regions attenuated as a function of distance therefrom.

41. The method of claim 33 further comprising the steps of:
   detecting a minimum power level required to maintain system user address corresponding code-division-spread-spectrum communication signals in a system user communication link above a predetermined incident power level;
   providing a link control signal corresponding to said detected minimum power level; and
   adjusting a transmission power level for said system user address corresponding code-division-spread-spectrum communication signals in response to said link control signal.

42. The method of claim 33 further comprising the step of transmitting a pilot chip sequence comprising a predetermined sequence of data bits.

43. The method of claim 33 wherein said step of transmitting comprises the steps of transmitting to and from a plurality of users through a repeater.

44. The method of claim 43 wherein said steps of transmitting to and from comprises the steps of transmitting to and from a terrestrial repeater 45. The method of claim 43 wherein said steps of transmitting to and from comprises the steps of transmitting to and from at least one satellite repeater.

46. The method of claim 43 wherein said steps of transmitting to and from comprises the steps of transmitting to and from at least one satellite repeater and at least one terrestrially based repeater.

* * * * *